US009105146B2

(12) United States Patent
Wolf

(10) Patent No.: US 9,105,146 B2
(45) Date of Patent: Aug. 11, 2015

(54) CENTRAL DETERMINATION OFFER AND ACCEPTANCE GAME WITH MULTIPLIER

(75) Inventor: Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 2199 days.

(21) Appl. No.: 11/048,220

(22) Filed: Jan. 31, 2005

(65) Prior Publication Data

US 2006/0172791 A1 Aug. 3, 2006

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/32* (2013.01); *G07F 17/3244* (2013.01)

(58) Field of Classification Search

USPC .................................... 463/19, 21, 20, 22, 18

See application file for complete search history.

(56) References Cited

U.S. PATENT DOCUMENTS

| | | | | |
|---|---|---|---|---|
| 2,743,108 | A | 4/1956 | Sanders | |
| 4,157,829 | A | 6/1979 | Goldman et al. | |
| 4,332,389 | A | 6/1982 | Loyd et al. | |
| 4,335,809 | A | 6/1982 | Wain | |
| 4,339,798 | A | 7/1982 | Hedges et al. | |
| 4,365,810 | A | 12/1982 | Richardson | |
| 4,373,726 | A | 2/1983 | Churchill et al. | |
| 4,448,419 | A | 5/1984 | Telnaes | |
| 4,455,025 | A | 6/1984 | Itkis | |
| 4,467,424 | A | 8/1984 | Hedges et al. | |
| 4,494,197 | A | 1/1985 | Troy et al. | |
| 4,527,798 | A | 7/1985 | Siekierski et al. | |
| 4,560,161 | A | 12/1985 | Hamano | |
| 4,582,324 | A * | 4/1986 | Koza et al. | 463/16 |
| 4,624,459 | A | 11/1986 | Kaufman | |
| 4,624,462 | A | 11/1986 | Itkis | |
| 4,636,951 | A | 1/1987 | Harlick | |
| 4,652,998 | A | 3/1987 | Koza et al. | |
| 4,669,730 | A | 6/1987 | Small | |

(Continued)

FOREIGN PATENT DOCUMENTS

| | | |
|---|---|---|
| EP | 0 449 433 A2 | 10/1991 |
| EP | 0 874 337 A1 | 10/1998 |

(Continued)

OTHER PUBLICATIONS

"American Bandstand Article" in Slot City Times published 2001.

(Continued)

*Primary Examiner* — Reginald Renwick

(74) *Attorney, Agent, or Firm* — Neal, Gerber & Eisenberg LLP

(57) ABSTRACT

A central determination gaming system wherein a predetermined game outcome that is associated with a payout is selected. A player is enabled to play at least one interactive game, such as an offer and acceptance type game, wherein each payout potentially provided to the player is based, at least in part, on the selected predetermined game outcome. After providing the player the payout of the interactive game, the gaming device provides the player by one or more multipliers wherein each multiplier is based on the selected predetermined game outcome. The modified payout is then provided to the player, wherein the modified payout is equal to the payout associated with the selected predetermined game outcome.

46 Claims, 11 Drawing Sheets

(56) References Cited

U.S. PATENT DOCUMENTS

| | | | |
|---|---|---|---|
| 4,679,143 A | 7/1987 | Hagiwara | |
| 4,689,742 A | 8/1987 | Troy et al. | |
| 4,695,053 A | 9/1987 | Vazquez, Jr. et al. | |
| 4,775,155 A | 10/1988 | Lees | |
| 4,798,387 A | 1/1989 | Richardson | |
| 4,805,907 A | 2/1989 | Hagiwara | |
| 4,815,741 A | 3/1989 | Small | |
| 4,817,951 A | 4/1989 | Crouch et al. | |
| 4,842,278 A | 6/1989 | Markowicz | |
| 4,848,771 A | 7/1989 | Richardson | |
| 4,856,787 A | 8/1989 | Itkis | |
| 4,880,237 A | 11/1989 | Kishishita | |
| 4,882,473 A | 11/1989 | Bergeron et al. | |
| 4,982,337 A | 1/1991 | Burr et al. | |
| 4,991,848 A | 2/1991 | Greenwood et al. | |
| 5,007,649 A | 4/1991 | Richardson | |
| 5,042,809 A | 8/1991 | Richardson | |
| 5,092,598 A | 3/1992 | Kamille | |
| 5,116,055 A | 5/1992 | Tracy | |
| 5,119,295 A | 6/1992 | Kapur | |
| 5,158,293 A | 10/1992 | Mullins | |
| 5,178,390 A | 1/1993 | Okada | |
| 5,205,555 A | 4/1993 | Hamano | |
| 5,223,698 A | 6/1993 | Kapur | |
| 5,265,874 A | 11/1993 | Dickinson et al. | |
| 5,275,400 A | 1/1994 | Weingardt et al. | |
| 5,276,312 A | 1/1994 | McCarthy | |
| 5,282,620 A | 2/1994 | Keesee | |
| 5,297,802 A | 3/1994 | Pocock et al. | |
| 5,324,035 A | 6/1994 | Morris et al. | |
| 5,326,104 A | 7/1994 | Pease et al. | |
| 5,342,047 A | 8/1994 | Heidel et al. | |
| 5,348,299 A | 9/1994 | Clapper, Jr. | |
| 5,351,970 A | 10/1994 | Fioretti | |
| 5,377,975 A | 1/1995 | Clapper, Jr. | |
| 5,393,057 A | 2/1995 | Marnell, II | |
| 5,393,061 A | 2/1995 | Manship et al. | |
| 5,398,932 A | 3/1995 | Eberhardt et al. | |
| 5,407,199 A | 4/1995 | Gumina | |
| 5,407,200 A | 4/1995 | Zalabah | |
| 5,411,271 A | 5/1995 | Mirando | |
| 5,456,465 A | 10/1995 | Durham | |
| 5,476,259 A | 12/1995 | Weingardt | |
| 5,487,544 A | 1/1996 | Clapper, Jr. | |
| 5,524,888 A | 6/1996 | Heidel | |
| 5,536,008 A | 7/1996 | Clapper, Jr. | |
| 5,536,016 A | 7/1996 | Thompson | |
| 5,542,669 A | 8/1996 | Charron et al. | |
| 5,560,603 A | 10/1996 | Seelig et al. | |
| 5,562,284 A | 10/1996 | Stevens | |
| 5,564,701 A | 10/1996 | Dettor | |
| 5,580,311 A | 12/1996 | Haste, III | |
| 5,595,538 A | 1/1997 | Haste, III | |
| 5,609,337 A | 3/1997 | Clapper, Jr. | |
| 5,611,535 A | 3/1997 | Tiberio | |
| 5,611,730 A | 3/1997 | Weiss | |
| 5,628,684 A | 5/1997 | Boudec | |
| 5,630,754 A | 5/1997 | Rebane | |
| 5,639,089 A | 6/1997 | Matsumoto et al. | |
| 5,641,730 A | 6/1997 | Brown | |
| 5,645,485 A | 7/1997 | Clapper, Jr. | |
| 5,645,486 A | 7/1997 | Nagao et al. | |
| 5,647,798 A | 7/1997 | Falciglia | |
| 5,657,899 A | 8/1997 | Stoken | |
| 5,674,128 A | 10/1997 | Holch et al. | |
| 5,697,843 A | 12/1997 | Manship et al. | |
| 5,709,603 A * | 1/1998 | Kaye | 463/17 |
| 5,711,525 A | 1/1998 | Breeding | |
| 5,720,483 A | 2/1998 | Trinh | |
| 5,735,432 A | 4/1998 | Stoken et al. | |
| 5,749,784 A | 5/1998 | Clapper, Jr. | |
| 5,755,619 A | 5/1998 | Matsumoto et al. | |
| 5,769,716 A | 6/1998 | Saffari et al. | |
| 5,772,509 A | 6/1998 | Weiss | |
| 5,775,692 A | 7/1998 | Watts et al. | |
| 5,779,545 A | 7/1998 | Berg et al. | |
| 5,779,547 A | 7/1998 | SoRelle et al. | |
| 5,788,573 A | 8/1998 | Baerlocher et al. | |
| 5,800,269 A | 9/1998 | Holch et al. | |
| 5,810,664 A | 9/1998 | Clapper, Jr. | |
| 5,823,873 A | 10/1998 | Moody | |
| 5,823,874 A | 10/1998 | Adams | |
| 5,830,067 A | 11/1998 | Graves et al. | |
| 5,833,537 A | 11/1998 | Barrie | |
| 5,833,538 A | 11/1998 | Weiss | |
| 5,848,932 A | 12/1998 | Adams | |
| 5,851,148 A | 12/1998 | Brune et al. | |
| 5,855,515 A | 1/1999 | Pease et al. | |
| 5,871,398 A | 2/1999 | Schneier et al. | |
| 5,873,781 A | 2/1999 | Keane | |
| 5,876,283 A | 3/1999 | Parra et al. | |
| 5,882,260 A | 3/1999 | Marks et al. | |
| 5,882,261 A | 3/1999 | Adams | |
| 5,890,962 A | 4/1999 | Takemoto | |
| 5,893,718 A | 4/1999 | O'Donnell | |
| 5,902,184 A | 5/1999 | Bennett et al. | |
| 5,911,418 A | 6/1999 | Adams | |
| 5,915,588 A | 6/1999 | Stoken et al. | |
| 5,927,714 A | 7/1999 | Kaplan | |
| 5,928,082 A | 7/1999 | Clapper, Jr. | |
| 5,935,002 A | 8/1999 | Falciglia | |
| 5,941,771 A | 8/1999 | Haste, III | |
| 5,944,606 A | 8/1999 | Gerow | |
| 5,947,820 A | 9/1999 | Morro et al. | |
| 5,949,042 A | 9/1999 | Dietz, II et al. | |
| 5,951,397 A | 9/1999 | Dickinson | |
| 5,954,582 A | 9/1999 | Zach | |
| 5,964,463 A | 10/1999 | Moore, Jr. | |
| 5,967,894 A | 10/1999 | Kinoshita et al. | |
| 5,976,016 A | 11/1999 | Moody et al. | |
| 5,980,384 A | 11/1999 | Barrie | |
| 5,980,385 A | 11/1999 | Clapper, Jr. | |
| 5,984,779 A | 11/1999 | Bridgeman et al. | |
| 5,984,781 A | 11/1999 | Sunaga | |
| 5,997,400 A | 12/1999 | Seelig et al. | |
| 5,997,401 A | 12/1999 | Crawford | |
| 6,004,207 A | 12/1999 | Wilson, Jr. et al. | |
| 6,007,066 A | 12/1999 | Moody | |
| 6,012,984 A | 1/2000 | Roseman | |
| 6,015,346 A | 1/2000 | Bennett | |
| 6,017,032 A | 1/2000 | Grippo et al. | |
| 6,019,369 A | 2/2000 | Nakagawa et al. | |
| 6,024,640 A | 2/2000 | Walker et al. | |
| 6,033,307 A | 3/2000 | Vancura | |
| 6,056,289 A | 5/2000 | Clapper, Jr. | |
| 6,056,642 A | 5/2000 | Bennett | |
| 6,059,289 A | 5/2000 | Vancura | |
| 6,059,658 A | 5/2000 | Mangano et al. | |
| 6,062,980 A | 5/2000 | Luciano | |
| 6,062,981 A | 5/2000 | Luciano, Jr. | |
| 6,089,976 A | 7/2000 | Schneider et al. | |
| 6,089,977 A | 7/2000 | Bennett | |
| 6,089,978 A | 7/2000 | Adams | |
| 6,089,982 A | 7/2000 | Holch et al. | |
| 6,093,100 A | 7/2000 | Singer et al. | |
| 6,093,102 A | 7/2000 | Bennett | |
| 6,102,798 A | 8/2000 | Bennett | |
| 6,120,024 A | 9/2000 | Lind | |
| 6,120,031 A | 9/2000 | Adams | |
| 6,120,377 A | 9/2000 | McGinnis, Sr. et al. | |
| 6,126,541 A | 10/2000 | Fuchs | |
| 6,126,542 A | 10/2000 | Fier | |
| 6,126,547 A | 10/2000 | Ishimoto | |
| 6,135,884 A | 10/2000 | Hedrick et al. | |
| 6,142,873 A | 11/2000 | Weiss et al. | |
| 6,142,874 A | 11/2000 | Kodachi et al. | |
| 6,142,875 A | 11/2000 | Kodachi et al. | |
| 6,146,272 A | 11/2000 | Walker et al. | |
| 6,146,273 A | 11/2000 | Olsen | |
| 6,149,156 A | 11/2000 | Feola | |
| 6,155,925 A | 12/2000 | Giobbi et al. | |
| 6,159,095 A | 12/2000 | Frohm et al. | |
| 6,159,096 A | 12/2000 | Yoseloff | |
| 6,159,097 A | 12/2000 | Gura | |

(56) References Cited

U.S. PATENT DOCUMENTS 6,159,098 A 12/2000 Slomiany et al.
6,162,121 A 12/2000 Morro et al.
6,168,520 B1 1/2001 Baerlocher et al.
6,168,521 B1 1/2001 Luciano et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,183,361 B1 2/2001 Cummings et al.
6,186,894 B1 2/2001 Mayeroff
6,190,254 B1 2/2001 Bennett
6,190,255 B1 2/2001 Thomas et al.
6,203,429 B1 3/2001 Demar et al.
6,210,275 B1 4/2001 Olsen
6,210,276 B1 4/2001 Mullins
6,210,279 B1 4/2001 Dickinson
6,213,876 B1 4/2001 Moore, Jr.
6,217,448 B1 4/2001 Olsen
6,220,961 B1 4/2001 Keane et al.
6,224,483 B1 5/2001 Mayeroff
6,231,442 B1 5/2001 Mayeroff
6,231,445 B1 5/2001 Acres
6,234,897 B1 5/2001 Frohm et al.
6,241,606 B1 6/2001 Riendeau et al.
6,254,480 B1 7/2001 Zach
6,254,481 B1 7/2001 Jaffe
6,261,177 B1 7/2001 Bennett
6,270,412 B1 8/2001 Crawford et al.
6,273,820 B1 8/2001 Haste, III
6,280,325 B1 8/2001 Fisk
6,280,328 B1 8/2001 Holch et al.
6,302,790 B1 10/2001 Brossard
6,302,791 B1 10/2001 Frohm et al.
6,305,686 B1 10/2001 Perrie et al.
6,306,038 B1 10/2001 Graves et al.
6,309,298 B1 10/2001 Gerow
6,309,300 B1 10/2001 Glavich
6,315,289 B1 11/2001 Sakamoto et al.
6,315,660 B1 11/2001 DeMar et al.
6,315,664 B1 11/2001 Baerlocher et al.
6,319,123 B1 11/2001 Paludi
6,319,124 B1 11/2001 Baerlocher et al.
6,322,309 B1 11/2001 Thomas et al.
6,325,716 B1 12/2001 Walker et al.
6,328,649 B1 12/2001 Randall et al.
6,334,814 B1 1/2002 Adams
6,336,863 B1 1/2002 Baerlocher et al.
6,338,678 B1 1/2002 Seelig et al.
6,346,043 B1 2/2002 Colin et al.
6,347,996 B1 2/2002 Gilmore et al.
6,358,150 B1 3/2002 Mir et al.
6,358,151 B1 3/2002 Enzminger et al.
6,364,766 B1 4/2002 Anderson et al.
6,364,767 B1 4/2002 Brossard et al.
6,368,218 B2 4/2002 Angell, Jr.
6,375,187 B1 4/2002 Baerlocher et al.
6,386,977 B1 5/2002 Hole
6,398,218 B1 6/2002 Vancura
6,398,644 B1 6/2002 Perrie et al.
6,402,614 B1 6/2002 Schneier et al.
6,413,160 B1 7/2002 Vancura
6,413,161 B1 7/2002 Baerlocher et al.
6,419,583 B1 7/2002 Crumby et al.
6,428,412 B1 8/2002 Anderson et al.
6,435,511 B1 8/2002 Vancura et al.
6,439,995 B1 8/2002 Hughs-Baird et al.
6,443,837 B1 9/2002 Jaffe et al.
6,447,395 B1 9/2002 Stevens
6,450,884 B1 9/2002 Seelig et al.
6,450,885 B2 9/2002 Schneier et al.
6,454,648 B1 9/2002 Kelly et al.
RE37,885 E 10/2002 Acres et al.
6,461,241 B1 10/2002 Webb et al.
6,464,582 B1 10/2002 Baerlocher et al.
6,471,591 B1 10/2002 Crumby
6,475,086 B2 11/2002 Zach
6,481,713 B2 11/2002 Perrie et al.
6,482,089 B2 11/2002 Demar et al.
6,494,785 B1 12/2002 Gerrard et al.
6,506,118 B1 1/2003 Baerlocher et al.
6,508,707 B2 1/2003 DeMar et al.
6,508,711 B1 1/2003 Ono
6,514,141 B1 2/2003 Kaminkow et al.
6,524,184 B1 2/2003 Lind et al.
6,524,185 B2 2/2003 Lind
6,527,638 B1 3/2003 Walker et al.
6,533,658 B1 3/2003 Walker et al.
6,533,660 B2 3/2003 Seelig et al.
6,533,664 B1 3/2003 Crumby
6,537,150 B1 3/2003 Luciano et al.
6,547,242 B1 4/2003 Sugiyama et al.
6,561,899 B2 5/2003 Vancura
6,561,904 B2 5/2003 Locke et al.
6,569,015 B1 5/2003 Baerlocher et al.
6,569,017 B2 5/2003 Enzminger et al.
6,575,830 B2 6/2003 Baerlocher et al.
6,582,307 B2 6/2003 Webb
6,585,591 B1 7/2003 Baerlocher et al.
6,595,854 B2 7/2003 Hughs-Baird et al.
6,599,185 B1 7/2003 Kaminkow et al.
6,599,187 B2 7/2003 Gerow
6,599,192 B1 7/2003 Baerlocher et al.
6,602,135 B1 8/2003 Gerrard
6,602,137 B2 8/2003 Kaminkow et al.
6,607,437 B2 8/2003 Casey et al.
6,607,439 B2 8/2003 Schneier et al.
6,619,660 B2 9/2003 Schaefer et al.
6,620,045 B2 9/2003 Berman et al.
6,632,141 B2 10/2003 Webb et al.
6,645,073 B2 11/2003 Lemay et al.
6,648,754 B2 11/2003 Baerlocher et al.
6,652,378 B2 11/2003 Cannon et al.
6,656,040 B1 12/2003 Brosnan et al.
6,656,043 B2 12/2003 Seelig et al.
6,656,044 B1 12/2003 Lewis
6,659,864 B2 12/2003 McGahn et al.
6,676,126 B1 1/2004 Walker et al.
6,682,419 B2 1/2004 Webb et al.
6,682,420 B2 1/2004 Webb et al.
6,685,562 B1 2/2004 Rantanen
6,692,355 B2 * 2/2004 Baerlocher et al. ............. 463/16
6,695,695 B2 2/2004 Angel
6,719,632 B2 4/2004 Palmer et al.
6,722,981 B2 4/2004 Kaminkow et al.
6,722,982 B2 4/2004 Kaminkow et al.
6,729,961 B1 5/2004 Millerschone
6,733,385 B1 5/2004 Enzminger et al.
6,749,500 B1 6/2004 Nelson et al.
6,758,750 B2 7/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
6,890,257 B2 5/2005 Baerlocher
6,899,623 B2 5/2005 Baerlocher
6,942,566 B2 9/2005 Baerlocher et al.
6,942,567 B2 9/2005 Baerlocher et al.
6,960,132 B2 11/2005 Baerlocher et al.
6,966,833 B2 11/2005 Kaminkow et al.
6,971,953 B2 12/2005 Gerrard et al.
7,001,273 B2 2/2006 Baerlocher
2002/0010013 A1 1/2002 Walker et al.
2002/0039917 A1 4/2002 Armstrong et al.
2002/0045472 A1 4/2002 Adams
2002/0045475 A1 4/2002 Glavich et al.
2002/0072402 A1 6/2002 Baerlocher
2002/0077173 A1 6/2002 Luciano et al.
2002/0077174 A1 6/2002 Luciano et al.
2002/0082070 A1 6/2002 Macke et al.
2002/0082071 A1 6/2002 Riendeau et al.
2002/0082085 A1 6/2002 Osterer

(56) References Cited

U.S. PATENT DOCUMENTS

| | | | | |
|---|---|---|---|---|
| 2002/0090986 | A1 | 7/2002 | Cote et al. | |
| 2002/0094855 | A1 | 7/2002 | Berman | |
| 2002/0094871 | A1 | 7/2002 | Luciano et al. | |
| 2002/0098882 | A1 | 7/2002 | Lind et al. | |
| 2002/0098883 | A1 | 7/2002 | Packes, Jr. et al. | |
| 2002/0111207 | A1 | 8/2002 | Lind et al. | |
| 2002/0111214 | A1 | 8/2002 | Lind et al. | |
| 2002/0113369 | A1 | 8/2002 | Weingardt | |
| 2002/0132661 | A1 | 9/2002 | Lind et al. | |
| 2002/0132666 | A1 | 9/2002 | Lind et al. | |
| 2002/0142822 | A1 | 10/2002 | Baerlocher et al. | |
| 2002/0198036 | A1 | 12/2002 | Baerlocher et al. | |
| 2003/0013514 | A1 | 1/2003 | Cregan et al. | |
| 2003/0040355 | A1 | 2/2003 | Baerlocher | |
| 2003/0040360 | A1 | 2/2003 | Kaminkow | |
| 2003/0045344 | A1 | 3/2003 | Webb et al. | |
| 2003/0045348 | A1 | 3/2003 | Palmer et al. | |
| 2003/0045350 | A1 | 3/2003 | Baerlocher et al. | |
| 2003/0060257 | A1 | 3/2003 | Katz et al. | |
| 2003/0060261 | A1 | 3/2003 | Katz et al. | |
| 2003/0060276 | A1 | 3/2003 | Walker et al. | |
| 2003/0064772 | A1 | 4/2003 | Tempest et al. | |
| 2003/0064785 | A1 | 4/2003 | Stone et al. | |
| 2003/0064795 | A1 | 4/2003 | Baerlocher et al. | |
| 2003/0069064 | A1 | 4/2003 | Ainsworth | |
| 2003/0078093 | A1 | 4/2003 | Simms et al. | |
| 2003/0100371 | A1 | 5/2003 | Gatto et al. | |
| 2003/0100372 | A1 | 5/2003 | Gatto et al. | |
| 2003/0119583 | A1 | 6/2003 | Kaminkow et al. | |
| 2003/0125101 | A1 | 7/2003 | Campo | |
| 2003/0162584 | A1 | 8/2003 | Hughs-Baird et al. | |
| 2003/0181231 | A1 | 9/2003 | Vancura et al. | |
| 2003/0195027 | A1 | 10/2003 | Baerlocher et al. | |
| 2003/0207709 | A1 | 11/2003 | Paotrakul | |
| 2003/0207710 | A1 | 11/2003 | Rodgers et al. | |
| 2003/0211884 | A1 | 11/2003 | Gauselmann | |
| 2004/0002372 | A1 | 1/2004 | Rodgers et al. | |
| 2004/0014515 | A1 | 1/2004 | Tracy et al. | |
| 2004/0023707 | A1 | 2/2004 | Maya et al. | |
| 2004/0029631 | A1 | 2/2004 | Duhamel | |
| 2004/0036212 | A1 | 2/2004 | Walker et al. | |
| 2004/0038723 | A1 | 2/2004 | Schneier et al. | |
| 2004/0038729 | A1 | 2/2004 | Webb et al. | |
| 2004/0048659 | A1 * | 3/2004 | Seelig et al. | 463/25 |
| 2004/0053673 | A1 | 3/2004 | Mishra | |
| 2004/0053683 | A1 | 3/2004 | Hartl et al. | |
| 2004/0072619 | A1 | 4/2004 | Brosnan et al. | |
| 2004/0106444 | A1 | 6/2004 | Cuddy et al. | |
| 2004/0152509 | A1 | 8/2004 | Hornik et al. | |
| 2004/0162128 | A1 | 8/2004 | Baerlocher et al. | |
| 2004/0180710 | A1 | 9/2004 | Palmer et al. | |
| 2004/0185928 | A1 | 9/2004 | Baerlocher et al. | |
| 2004/0214632 | A1 | 10/2004 | Cuddy et al. | |
| 2005/0020342 | A1 | 1/2005 | Palmer et al. | |
| 2005/0020346 | A1 | 1/2005 | Baerlocher | |
| 2005/0032567 | A1 | 2/2005 | Baerlocher et al. | |
| 2005/0037829 | A1 | 2/2005 | Baerlocher et al. | |
| 2005/0049036 | A1 | 3/2005 | Mead | |
| 2005/0054413 | A1 * | 3/2005 | Randall et al. | 463/16 |
| 2005/0055115 | A1 | 3/2005 | Gerrard et al. | |
| 2005/0101375 | A1 | 5/2005 | Webb et al. | |
| 2005/0130729 | A1 | 6/2005 | Baerlocher et al. | |
| 2005/0153767 | A1 | 7/2005 | Gauselmann | |
| 2005/0187010 | A1 | 8/2005 | Baerlocher | |
| 2005/0266914 | A1 | 12/2005 | Baerlocher et al. | |
| 2006/0003837 | A1 | 1/2006 | Baerlocher et al. | |
| 2006/0040734 | A1 * | 2/2006 | Baerlocher et al. | 463/26 |

FOREIGN PATENT DOCUMENTS

| | | | |
|---|---|---|---|
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| GB | 2 117 952 | A | 10/1983 |
| GB | 2 137 392 | A | 10/1984 |
| GB | 2 170 636 | A | 8/1986 |
| GB | 2 191 030 | A | 12/1987 |
| GB | 2 201 821 | A | 9/1988 |
| GB | 2 322 217 | A | 8/1998 |
| WO | WO 9732285 | | 9/1997 |
| WO | WO 00/12186 | | 3/2000 |
| WO | WO 02097749 | | 12/2002 |

OTHER PUBLICATIONS

Anchor Games Unveils 'City of Slots', Anchor Games Slot City Times, Oct. 2001.
Austin Powers in Goldmember™ Advertisement written by IGT, published in 2003.
Big Bang Piggy Bankin Advertisement, written by WMS Gaming, published prior to 2004.
By George Advertisement, written by IGT, published in 2002.
Cash Box Advertisement, written by Anchor Games, published in 2000.
Diamonopoly Advertisement, written by International Gamco, Inc., published 2002.
Electronic Pull Tabs Advertisement, written by 21st Century Gaming, published prior to 2002.
Instant Winner Advertisement, written by Williams/WMS Gaming, published prior to 2002.
Jackpot Party Advertisements, written by WMS Gaming, published in 1998.
Let's Make a Deal Advertisement, written by Bally Gaming, published in 1999.
Let's Make a Deal Advertisements, written by various sources, published prior to 2004.
Lucky Times California Lottery Newsletter published 1996.
Monopoly Advertisements, written by WMS Gaming, published in 2000.
Monte Carlo Advertisement written by Bally Gaming, published prior to Sep. 12, 2002.
Play it again Advertisement, written by International Gamco, Inc., published 2000.
Price is Right "Cliff Hangers" Description, 2004. written by www.geocities.com; published prior to 2004.
Slot Machines [In Part] written by Marshal Fey, published 1997.
Take Your Pick Advertisement, written by IGT/Anchor Gaming, published in 1999.
Take Your Pick Article, written by Strictly Slots, published in Mar. 2001.
Texas Tea Advertisement, written by IGT, published in 2000.
Top Dollar Game Advertisement, written by IGT, published in 1998.
Wheel & Deal Brochure written by Anchor Games, Strictly Slots, published in Dec. 2001.
Wheel of Fortune Advertisement written by IGT, published in 1998.
Wheel of Fortune Advertisement written by IGT, published in 1999.
Wheel Poker Brochure written by Anchor Games/Bally Gaming, Strictly Slots, prior to Sep. 12, 2002.

* cited by examiner

FIG. 4A

| Selected Predetermined Game Outcome: Win $150 | | | | | | |
|---|---|---|---|---|---|---|
| Potential Offers | 5 | 10 | 15 | 30 | 50 | 75 |
| Applicable Multipliers | 30X | 15X | 10X | 5X | 3X | 2X |

122
124
126

FIG. 4B

| Selected Predetermined Game Outcome: Win $80 | | | | | | |
|---|---|---|---|---|---|---|
| Potential Offers | 8 | 10 | 16 | 20 | 40 | 80 |
| Applicable Multipliers | 10X | 8X | 5X | 4X | 2X | 1X |

128
130
132

CENTRAL DETERMINATION OFFER AND ACCEPTANCE GAME WITH MULTIPLIER

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The majority of the contemporary wagering gaming devices or gaming devices, such as slot machines, randomly generate awards and other outcomes. Such gaming devices typically include a relatively low probability associated with obtaining the highest award, relatively medium probabilities associated with obtaining medium range awards and relatively higher probabilities associated with obtaining low range awards. These gaming devices also include probabilities associated with obtaining losses or no award at all. The probabilities of obtaining the awards and the amount of the awards determine the average expected pay out percentage of these wagering gaming devices. Because the outcomes of these gaming devices are completely randomly determined, there is no certainty that a player will ever obtain any particular award. That is, no matter how many times a player plays the game, since the gaming device generates outcomes randomly or completely based upon a probability calculation, there is no certainty that the game will ever provide the player with a rare outcome, such as a jackpot award, or any other specific value for that matter. On the other hand, due to the random determination, the gaming device can provide the rare outcomes, such as jackpot awards, numerous times in a small number of plays. For example, a probability-based $1 slot machine gaming device may be programmed to payback on average 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based slot machine gaming device, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming devices in-part for these reasons. These regulatory bodies permit the use of wagering gaming devices which are guaranteed to provide certain or definite awards, so that, for example, a certain number of wins is guaranteed and the overall amount paid back to players is guaranteed. That is, the payback percentage is fixed and not an average expected amount. One type of gaming device which complies with this requirement is an instant-type lottery gaming device. An instant-type lottery gaming device includes a finite pool or set of electronic tickets with each electronic ticket assigned to a predetermined game outcome. Alternatively, each electronic ticket could be assigned to a random number or game play seed. Each seed is deterministic of a predetermined game outcome. That is, the gaming device utilizes the random number or game play seed in a random number generating algorithm to generate random numbers that the gaming device then uses to determine and provide the predetermined game outcome. In an instant-type lottery gaming device, as the predetermined game outcome for each electronic ticket is revealed to a player on the gaming device, the ticket is removed (i.e., flagged as used) from the finite pool or set of electronic tickets. Once removed from the pool or set, a ticket cannot be used again to determine another game outcome. This type of gaming device provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined game outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

Even though a pool may contain more than one of the same game outcome (i.e., the loss or the win and if a win, the value), the presentation to the player (such as reel stops in the case of slot machines or simulated slot machines, cards dealt or drawn in the case of simulated card games and the like) is preferably varied for each sequential game outcome. For example, in the twenty ticket pool described above, while three game outcomes may each determine a win game outcome with a value of $1, in a slot machine type game, the three game outcomes are preferably presented to the player as different winning combinations of reel symbols.

Central determination gaming systems are also generally known. A central determination gaming system provides a plurality of individual gaming devices, located in a gaming establishment, such as a casino, coupled by one or more communication links, to a central processor or controller. When a player plays a game on one of the gaming devices, a game outcome is randomly generated by the central controller based on probability data. The generated game outcome and how the game outcome is to be presented or displayed to the player are communicated from the central controller to the individual gaming device and then provided to the player. It should be appreciated that one central processor may continuously run hundreds or thousands of individual gaming devices at once. Additionally, each individual gaming device may include a plurality of different types of games played at a plurality of different denominations.

To comply with the above mentioned regulatory rules that do not permit the use of probability-based gaming devices, central determination gaming systems have been implemented wherein the central system maintains one or more predetermined pools or sets of game outcomes. Each game outcome in each set or pool includes a game outcome component (i.e., a win, a lose, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected predetermined game outcome as used. Once a game outcome is flagged as used, it is prevented from further selection from the set or pool and cannot be selected by the central controller upon another wager. The selected predetermined game outcome is communicated to the individual gaming device. The individual gaming device displays or presents the game presentation component and provides the player the game outcome component with the associated value, if any, for the selected predetermined game outcome. Additionally, certain central determination gaming systems have also been implemented wherein the central system maintains one or more predetermined pools or sets of random number or game outcome seeds.

There are a number of advantages to providing for centralized production of game outcomes at individual gaming devices. Central production or control can assist a casino or other entity in maintaining appropriate records, controlling gaming, reducing and preventing cheating or electronic or other errors, reducing or eliminating win-loss volatility and the like. However, it should be appreciated that existing central determination gaming systems involve minimal to no player interaction other than initiating a game play at a gaming device. That is, similar to an instant type lottery game, the central controller selects a game outcome from the pool and the selected predetermined game outcome is provided to the player with the player unable to influence the provided game outcome. Therefore, a need exists for central determination gaming systems that provide an increased level of player interaction.

Gaming devices with one or more offer and acceptance games are also known. For example, the TOP DOLLAR® gaming device which is manufactured and distributed by the assignee of this application enables players to accept or decline multiple award offers. This gaming device provides the player with up to three randomly determined offers and a final award. When an offer is given, the player may accept or reject it by pushing an accept button or a reject button, respectively. If the player accepts an offer, the player receives the accepted offer amount and the offer and acceptance game terminates. If the player declines an offer, the game randomly generates another offer for the player. The player is automatically provided with the last selected offer if the player rejects the three previous offers. In this game, each offer can include one or more illuminated amounts. If an offer is rejected, the gaming machine terminates the illumination of such amounts and one or more amounts are illuminated to make the next offer. The previously illuminated amounts of the previous offer are not saved.

In this known offer/acceptance game, when the player rejects an offer, the player risks a current or guaranteed award for a higher value award. However, the game may instead provide a lower award, thus creating a risk for the player. Enabling a player to pick from different risk based alternatives and then enabling the player to accumulate awards or offers from the selected alternatives provides excitement and enjoyment to the player.

As the game outcome in a central determination gaming system is predetermined by the central controller and involves minimal to no player interaction and as the game outcome in an offer and acceptance type game is determined by the player based on which offer the player chooses to accept, an inconsistency may occur if the player's accepted offer differs from the selected predetermined game outcome. This inconsistency can interfere with the play of the offer/acceptance game because if the selected predetermined game outcome and the player's accepted offer differ, the player may be provided an offer they did not accept or the gaming device may provide the player an accepted offer different from the selected predetermined game outcome.

Accordingly, a need exists to provide an offer and acceptance game which involves a high degree of player interaction (i.e., sequentially accepting and rejecting provided offers) that is operational in a central determination gaming system.

SUMMARY OF THE INVENTION

The present invention relates in general to a central determination gaming system, and more particularly to a central determination gaming system having an offer and acceptance game with a multiplier. In one embodiment, upon the initiation of game play, a predetermined game outcome is selected. The selected predetermined game outcome is associated with a value amount or payout, if any, which must ultimately be provided to a player. If the selected predetermined game outcome is associated with a value amount or payout that is to be provided to the player in a designated interactive game, such as an offer and acceptance type game, then based on the selected predetermined game outcome, the gaming device determines a plurality of potential values or payouts and a plurality of potential modifiers or multipliers wherein the product of each potential value multiplied by its associated potential multiplier yields a value amount or payout for the interactive game that is associated with the selected predetermined game outcome. In other words, the gaming device determines a plurality of potential values that are each divisible by the interactive game payout associated with the selected predetermined game outcome. For each determined potential value, the gaming device determines the potential multiplier or modifier that, when applied to the determined potential value, results in a modified value equal to the value amount or payout associated with the selected predetermined game outcome. The gaming device then associates each determined potential value with the determined potential multiplier or modifier that results in a modified value equal to the value amount or payout associated with the selected predetermined game outcome.

In one embodiment, the gaming device enables the player to play at least one interactive game or event, such as an offer and acceptance type game, wherein each potential payout provided to the player in the interactive game is determined based on the selected predetermined game outcome. In one embodiment, the player is provided with at least one choice or decision in the interactive game and the player's choice or decision determines, at least in part, the potential value or payout provided to the player in the interactive game. After providing the player the determined payout or value for the interactive game or event, the gaming device modifies or multiplies the determined payout by one or more multipliers wherein the determined multiplier(s) are based on the determined payout and the selected predetermined game outcome. The modified payout from the interactive game is provided to the player, wherein it should be appreciated that as the determined interactive game payout is based on the selected predetermined game outcome (i.e., divisible by the selected predetermined game outcome value) and the determined multiplier is based on the selected predetermined game outcome value and the determined interactive game payout, the modified payout is equal to the payout associated with the selected predetermined game outcome.

In one embodiment, the predetermined game outcome is stored in a central controller. In this embodiment, upon a player initiating game play at the gaming device, the initiated gaming device communicates a game outcome request to the central server or controller. Upon receiving the game outcome request, the central controller independently selects a game outcome from a set or pool of game outcomes and flags or marks the selected predetermined game outcome as used. Once a game outcome is flagged as used, it is prevented from further selection from the set or pool and cannot be selected by the central controller upon another wager. The selected predetermined game outcome is communicated to the individual gaming device to be utilized in the initiated interactive game. In another embodiment, the predetermined game outcome is stored in a memory device of the gaming device. In this embodiment, the gaming device selects a game outcome from a set or pool of stored game outcomes and flags the selected predetermined game outcome as used.

In one embodiment, each predetermined game outcome includes an outcome component, such as a win, a lose, a secondary game triggering or other suitable outcome, with an associated value or pay amount, if any. In this embodiment, the gaming device enables the player to play any suitable primary game wherein the selected predetermined game outcome is utilized to determine a primary game outcome. The primary game outcome is either a win outcome with an associated value or payout that triggers a secondary or bonus game, a win outcome with an associated value or payout that does not trigger a secondary or bonus game, a lose outcome with no associated value or payout that does not trigger a secondary or bonus game or a secondary or bonus game qualifying condition or triggering event outcome with no associated value or payout in the primary game.

In one embodiment, if the primary game outcome is a win outcome with an associated value or payout that does not trigger a secondary or bonus game, the player is provided the associated value or payout and the primary game terminates. If the primary game outcome is a lose outcome with no associated value or payout that does not trigger a secondary or bonus game, the player is provided no value or payout and the primary game terminates. If the primary game outcome is or includes a secondary or bonus game triggering event (i.e., either a win outcome with an associated value or payout that triggers a secondary game win or a secondary game qualifying or triggering outcome with no associated value or payout in the primary game), the gaming device initiates, as described above, at least one interactive game wherein the modified payout provided to the player based on the interactive game and the determined multiplier equals the value or payout associated with the selected predetermined game outcome. In another embodiment, each game outcome also includes a presentation component. A presentation component is how the game outcome is presented or displayed to the player, such as which specific symbol combination will be displayed to the player.

In one embodiment wherein the interactive game is an offer and acceptance type game, the gaming device determines a plurality of offers based on the selected predetermined game outcome. In one embodiment, one, more or each of the plurality of determined offers are preferably less than or equal to the value or payout associated with the selected predetermined game outcome. For example, if the value associated with the selected predetermined game outcome is one-hundred, the gaming device may determine potential offers of five, ten, twenty, twenty-five and fifty. It should be appreciated that by setting each potential offer as a value less than the values associated with the selected predetermined game outcome, the gaming device insures that any accepted offer will be increased by the subsequently determined modifier or multiplier.

In one embodiment, after determining the plurality of potential offers, the gaming device enables the player to play any suitable offer and acceptance game utilizing the determined plurality of offers. The gaming device offers the player one of the plurality of offers for acceptance or rejection. If the player rejects the offer and the player has at least one offer remaining (i.e., the offer is not the last offer), the gaming device offers the player another one of the plurality of offers to accept or reject. This process continues until either the player accepts one of the plurality of offers or the player is offered the last offer which the player must accept. For example, the determined offer of twenty-five may be a final or last offer and thus automatically accepted for the player.

In one embodiment of an offer and acceptance type game, the gaming device provides a plurality of selections to the player and a number of picks of the selections. Each selection is associated with one of the determined plurality of offers. In this embodiment, the gaming device enables the player to pick one of the selections. After the player picks one of the selections, the number of player picks remaining is reduced and the gaming device reveals the offer associated with the picked selection. The player is enabled to accept or reject the revealed offer. If the player rejects the revealed offer and the player has at least one pick remaining, the gaming device enables the player to pick another one of the plurality of selections. The offer associated with this picked selection is revealed to the player and the player is enabled to accept or reject this revealed offer. This process continues until either the player accepts an offer or the player has no picks remaining.

In another embodiment, the gaming device utilizes one or more mechanical devices, such as a wheel or reel, to generate or display each of the plurality of offers in an offer and acceptance game. In another embodiment, the gaming device utilizes one or more dynamic lighting schemes to generate or display each of the plurality of offers in an offer and acceptance game. It should be appreciated that any suitable scheme or mechanism which is adapted to generate or display a plurality of offers and enable a player to sequentially accept or reject the generated offers may be implemented in accordance with the present invention.

After the player accepts one of the offers (or a final offer is automatically accepted), the gaming device determines an offer modifier or multiplier. The offer modifier or multiplier is based on the accepted offer and the selected predetermined game outcome. That is, the gaming device determines, based on the selected predetermined game outcome, a modifier or multiplier to be applied to the accepted offer to result in a modified offer equal to the payout associated with the selected predetermined game outcome. For example, the gaming device may determine that a multiplier of four must be applied to the accepted offer of twenty-five to yield a modified offer of one-hundred (which is equal to the selected predetermined game outcome). It should be appreciated that regardless of any level of player interaction, the gaming device will modify any offer provided to the player to insure that the player will obtain the value or payout associated with the predetermined game outcome. In another embodiment, the gaming device provides the player a plurality of multipliers wherein the total award provided to the player based on the plurality of multipliers and the accepted offer equal the payout associated with the selected predetermined game outcome.

In one embodiment, as described in more detail below, the modifier is provided to the player in a supplemental game. In another embodiment, the gaming device utilizes one or more mechanical devices, such as a wheel, reel or die, to generate and display a modifier in the supplemental game. In another embodiment, the gaming device utilizes one or more dynamic lighting schemes to generate and display a modifier in the supplemental game. It should be appreciated that any suitable game or mechanism which is adapted to generate a multiplier, that when applied to the accepted offer results in the payout associated with the selected predetermined game outcome may be employed as the supplemental game of the present invention.

In an alternative embodiment of the present invention, a plurality of multipliers that will be subsequently used to provide the player a predetermined game outcome are selected. In this embodiment, the least common multiple of all of the multipliers is determined and a set or pool of predetermined game outcomes is formed wherein each predetermined game outcome is a multiple of the least common multiplier. For example, if the determined multipliers are one, two, three and four, the determined least common multiple is twelve and thus all of the predetermined game outcomes must be multiples of twelve (e.g., twelve, twenty-four, thirty-six).

In this embodiment, after one of the predetermined game outcomes is selected, the selected predetermined game outcome is divided by each of the determined multipliers to determine the plurality of offers which may be provided to the player. For example, if the selected predetermined game outcome of win sixty is selected, the value of sixty is divided by the multipliers of one, two, three and four to determine the available offers of sixty, thirty, twenty and fifteen, respectively. The gaming device then enables the player to play at least one offer and acceptance game wherein the offer accepted by the player is modified by the appropriate modifier to result in the payout associated with the selected predetermined game outcome as described above.

The present invention provides a number of advantages over existing central determination gaming systems. For example, since the gaming devices of the present invention enable the player to make a choice or decision about which offer they will accept, the present invention includes an aspect of player interaction and player involvement for central determination gaming systems. That is, the present invention complies with certain regulations that require that a central controller maintains a pool of predetermined game outcomes (which guarantees a specific amount of actual wins and losses), while also providing the player a level of control over the play of the game. This increases the player's level of excitement and enjoyment.

Additional features and advantages of the present invention are described in, and will be apparent from, the following Detailed Description of the Invention and the figures.

BRIEF DESCRIPTION OF THE FIGURES

FIGS. 4A and 4B are tables illustrating two examples of one embodiment of the present invention wherein a plurality of different offers and a plurality of different multipliers are derived from different selected predetermined game outcomes.

DETAILED DESCRIPTION OF THE INVENTION

Figure 1A:
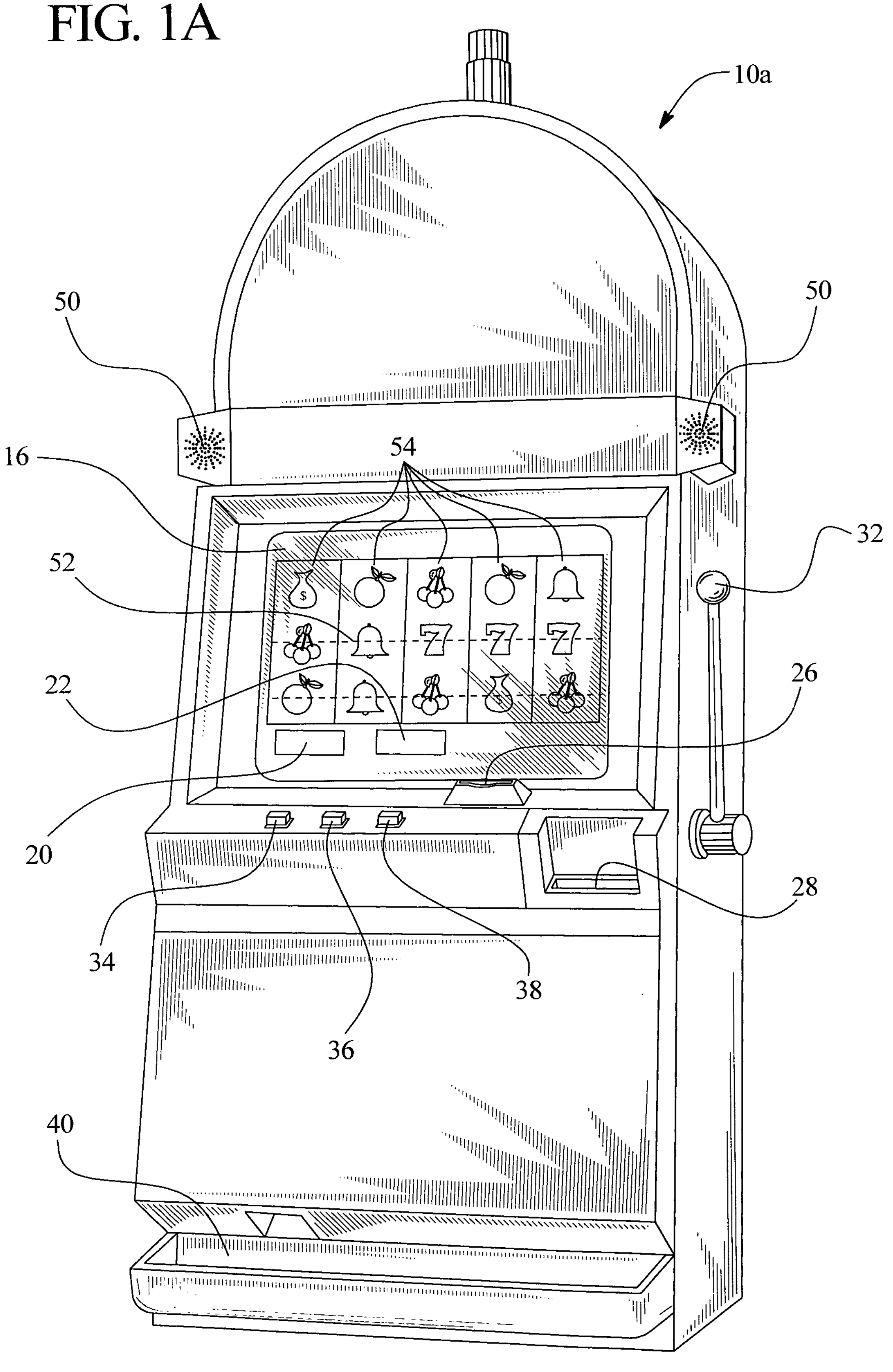
FIGS. 1A and 1B are perspective views of alternative embodiments of the gaming device of the present invention.
Figure 1B:
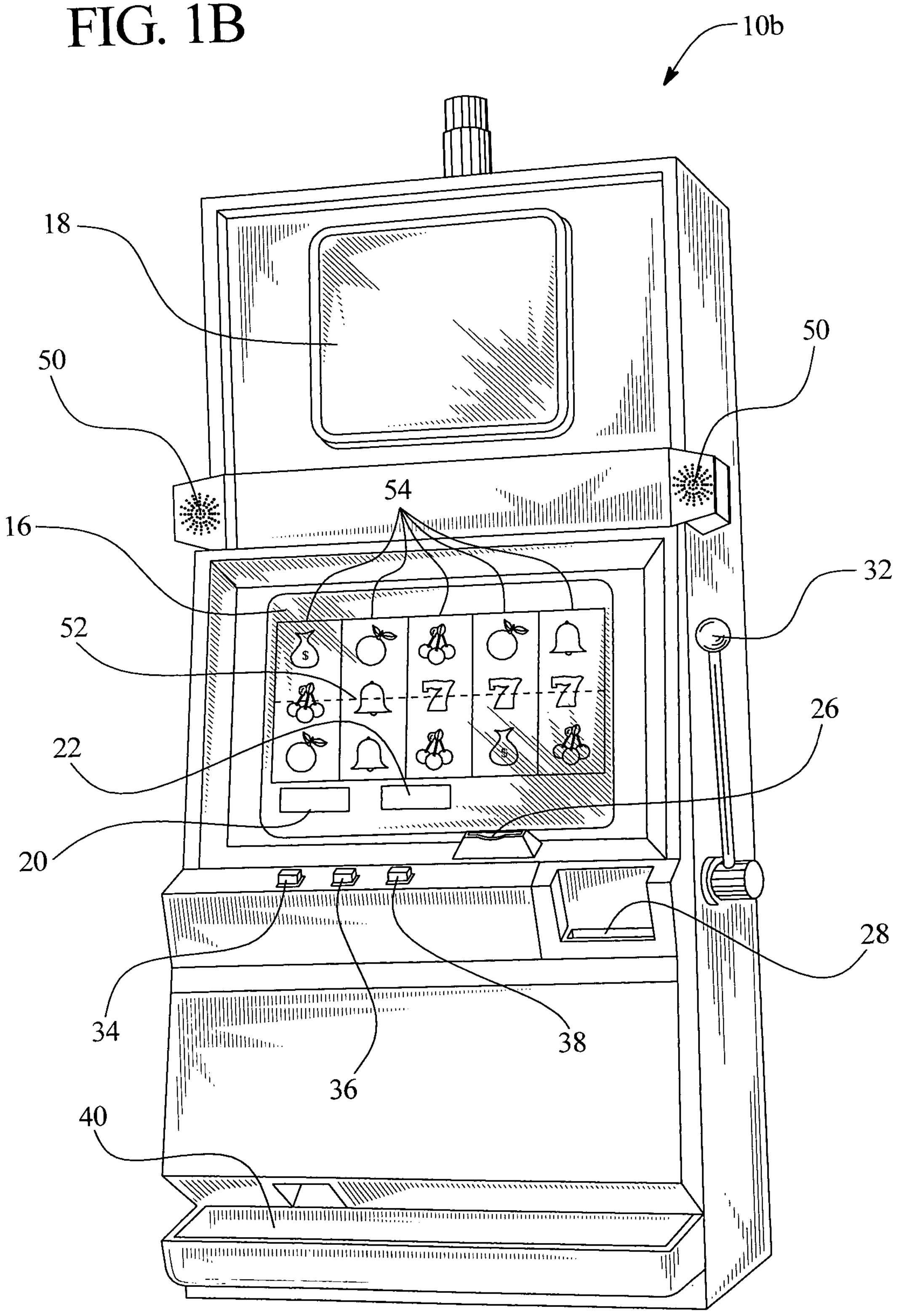

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
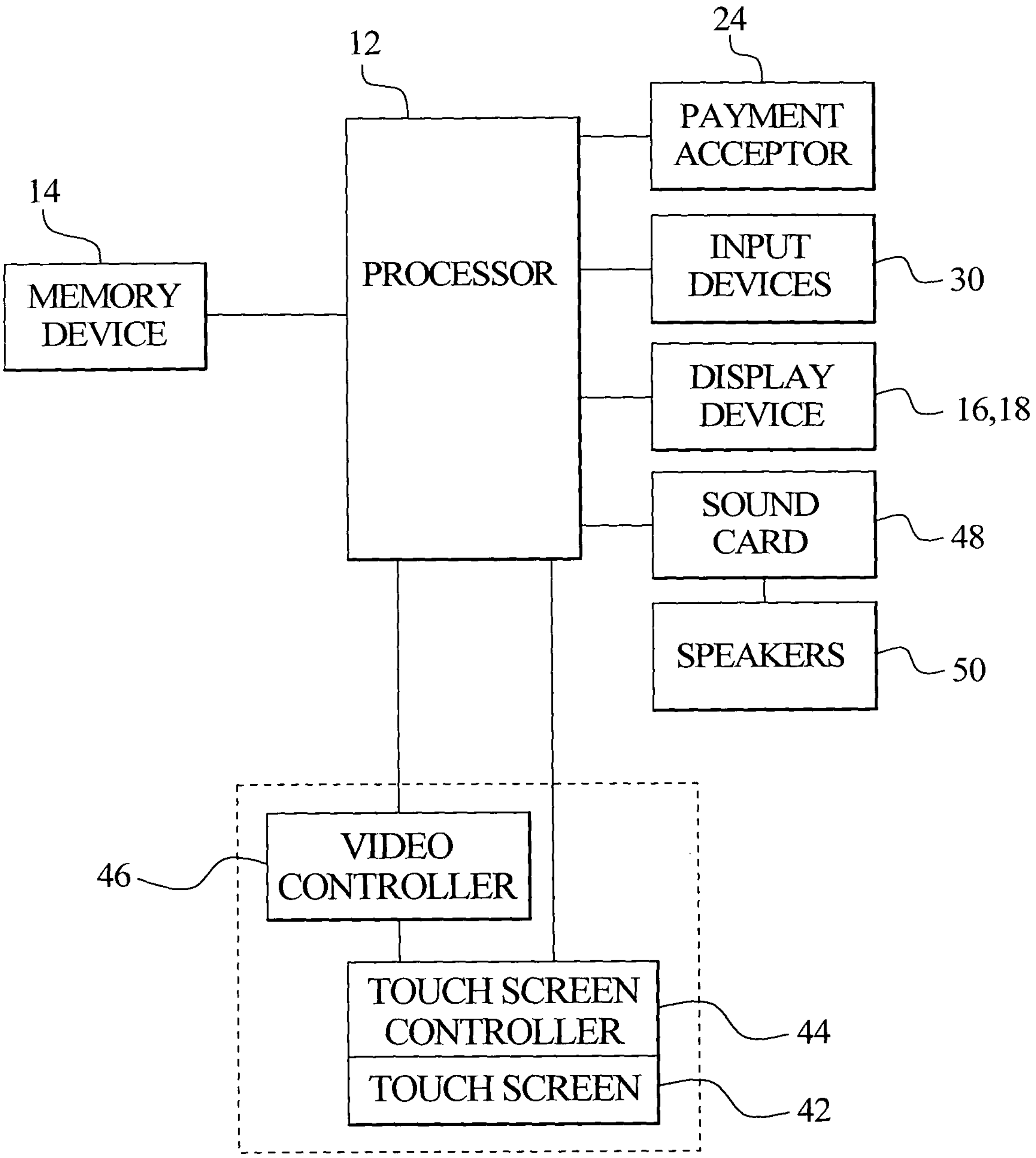
FIG. 2A is a schematic block diagram of an electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device stores a pool of predetermined game outcomes which will be provided to the players during the play of the interactive game of the present invention.

In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer."

In one embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols, playing cards and indicia such as any visual representation or exhibition of the movement of objects such as mechanical, virtual or video reels and wheels, dynamic lighting, video images, images of people, characters, places, things and faces of cards, tournament advertisements and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions, such as which playing cards to hold or discard and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
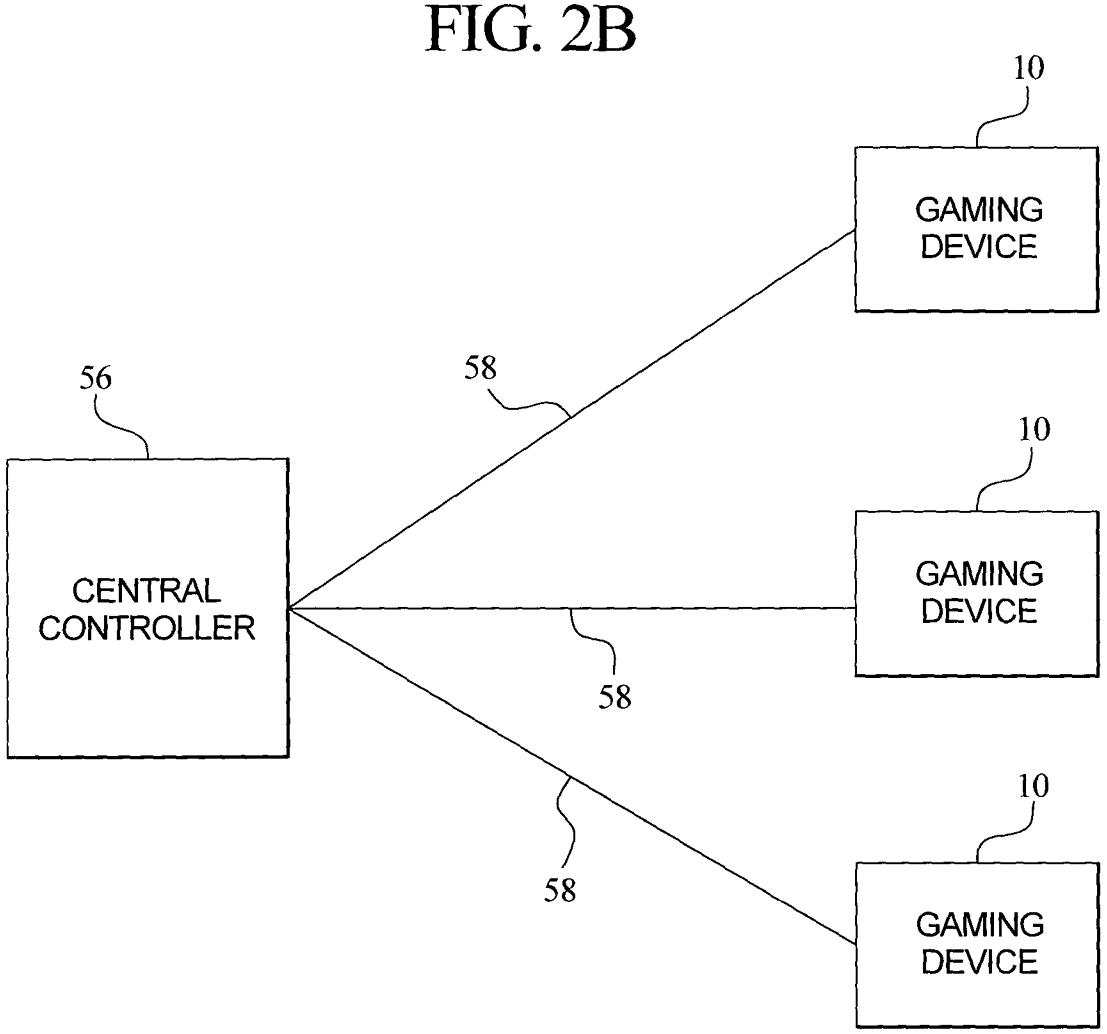
FIG. 2B is a schematic block diagram illustrating a plurality of gaming devices in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the predetermined game outcome provided to the player is selected by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller. Upon receiving the game outcome request, the central controller independently selects a game outcome from a set or pool of game outcomes and flags or marks the selected predetermined game outcome as used. Once a game outcome is flagged as used, it is prevented from further selection from the set or pool and cannot be selected by the central controller upon another wager. For example, if a pool or set includes thirty win $5 game outcomes and one is selected and flagged, the flagged win $5 game outcome cannot be selected again but the other twenty-nine non-selected win $5 game outcomes remain available for subsequent game outcome selections. The selected predetermined game outcome is communicated to the individual gaming device to be utilized in the interactive game.

In one embodiment, the central controller maintains at least one predetermined set or pool of predetermined game outcomes for each type of game provided on the gaming devices. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming devices. In another embodiment, the central controller maintains at least one predetermined set or pool of predetermined game outcome seeds. Each game outcome seed is deterministic of a predetermined game outcome. Other methods for storing the pool or set of predetermined game outcomes may be employed in accordance with the present invention.

Each predetermined game outcome includes an outcome component, such as a win, a lose, a secondary game triggering or other suitable outcome, with an associated value or pay amount, if any. For example, one game outcome may be a win $5 game outcome and another game outcome may be a lose or $0 game outcome. Each set or pool of predetermined game outcomes may include a plurality of each type of predetermined game outcome. For example, a pool of one thousand game outcomes may include hundreds of a lower range award (i.e., a win $1 game outcome) and one or few of the highest award (i.e., a win $1000 game outcome). In one embodiment, a plurality of the game outcomes in the predetermined set or pool are different. In another embodiment, all of the game outcomes in the set or pool are different.

In one embodiment, each game outcome may also include a presentation component. A presentation component is how the predetermined game outcome is presented or displayed to the player, such as a reel symbol combination of a slot machine, a hand of cards dealt or the order that each of a plurality of offers are offered to the player. In order to increase player entertainment, a plurality of game outcomes with the same outcome component and associated value have different presentation components. That is, the same win $5 game outcome is presented or displayed to the player in a different way. For example, in a slot machine style game, each of the same game outcomes are displayed or presented to the player as a different reel symbol combination. It should be appreciated that through the use of an appropriate pay table for the specific game played, the presentation component for each game outcome corresponds to the outcome component and associated value for that game outcome.

In one embodiment, all of the gaming devices which are coupled to the central processor are configured to play the same type of game. In an alternative embodiment, a plurality of the gaming devices are configured so that different gaming devices may be used to play different types of games. That is, some gaming devices may be used for playing a slot machine style game, others may be used for playing a poker style game, others may be used for playing a blackjack style game, and the like. In another embodiment, a plurality of gaming devices may each be configured for playing a plurality of different games.

In another embodiment, one or more of the gaming devices of the present invention are in communication with a central server or controller for monitoring purposes only. In this embodiment, each gaming device stores a pool of predetermined game outcomes to be provided to the player in a memory and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, a plurality of the gaming devices of the present invention are connected together and to a central controller through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server and operable to provide one or more progressive awards to one or more players. A progressive award is an award amount which includes an initial amount funded by a casino and an additional amount funded through a portion of each wager made on the progressive gaming device. For example, 1% of each wager on the primary game of the gaming device may be allocated to the progressive award or progressive award fund. The progressive award grows in value as more players play the gaming device and more portions of the players' wagers are allocated to the progressive award. When a player obtains a winning outcome which results in or is associated with the progressive award, the accumulated progressive award is provided to the player. After the progressive award is provided to the player, the amount of the next progressive award is reset to the initial value and a portion of each subsequent wager is allocated to the next progressive award as described above. In one embodiment, the progressive award payout is associated with one or more of the predetermined game outcomes which are stored in the pool of predetermined game outcomes.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In one embodiment, the gaming device can incorporate any suitable primary or base wagering game. The gaming machine or device of the present invention may include some or all of the features of conventional gaming machines or devices. The primary or base game may comprise any suitable reel-type game, card game, number game, player interactive game or other game of chance susceptible to representation in an electronic or electromechanical form which produces the selected predetermined game outcome. In one embodiment, the interactive game or event may be employed as the primary game of the present invention. In another embodiment, any suitable primary game may be employed with the present invention and the interactive game or event may be employed as one or more secondary games.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device utilizes the selected predetermined game outcome to determine a specific reel symbol combination to be displayed or presented to the player. The gaming device awards prizes when the reels of the primary game stop spinning if specified types and/or configurations of indicia or symbols occur on an active payline or otherwise occur in a winning pattern In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, wherein the number of matches is based, at least in part, on the selected predetermined game outcome.

In another embodiment, if the game is implemented as a primary game, then in addition to winning credits in the primary game, the gaming device may also give players the opportunity to win credits in a bonus or secondary game or bonus or secondary round. The bonus or secondary game enables the player to obtain a prize or payout in addition to the prize or payout, if any, obtained from the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

It should be appreciated that if the gaming device enables the player to play one or more other suitable games in addition to the interactive game, then regardless of how the game outcome is ultimately provided to the player, either as a value or payout from the primary or base game, as a value or payout from the secondary or bonus game, as a lose from the primary or base game or as a lose from the secondary or bonus game, the game outcome is predetermined. For example, if the particular game outcome associated with the player's choice or decision is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes.

Figure 3:
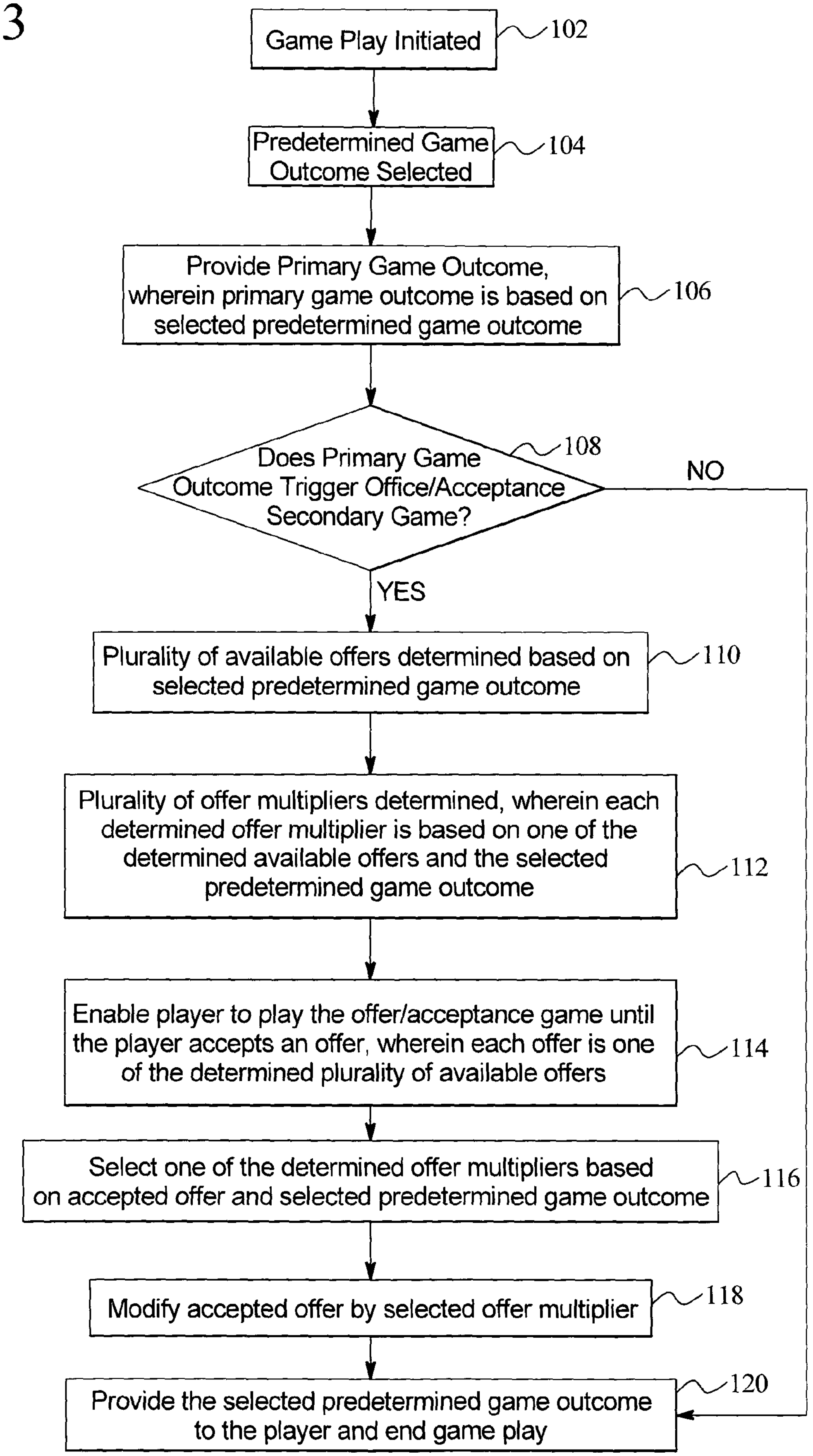
FIG. 3 is a schematic block diagram illustrating one embodiment of the present invention wherein a selected predetermined game outcome is provided to a player based on an offer and acceptance game and a modification of the accepted offer.

Referring to FIG. 3, game play of the present invention is initiated as indicated in block 102. In one embodiment, game player is initiated by a layer inserting the appropriate amount of money or tokens at the gaming device. After game play is initiated, a predetermined game outcome is selected as indicated in block 104. For example, as illustrated in FIG. 4A, a predetermined game outcome of win one-hundred-fifty 122 is selected.

In one embodiment, as described above, the gaming device is in communication with the central controller and the central controller selects a predetermined game outcome. The central controller then flags the selected predetermined game outcome as used (i.e., preventing the selected predetermined game outcome from being subsequently selected by the central controller) and communicates the predetermined game outcome to the gaming device. In another embodiment, the gaming device selects one of the predetermined game outcomes stored in a memory device of the gaming device.

In an alternative embodiment, the central controller maintains at least one set or pool of game outcome seeds. Each game outcome seed is a unique random number seed which is deterministic of a game outcome, such as a win outcome, a lose outcome or a secondary or bonus game triggering outcome. In this embodiment, as described above, the central controller selects a plurality of game outcome seeds from the set or pool of game outcome seeds. The central controller flags the selected predetermined game outcome seeds as unavailable and communicates the selected predetermined game outcome seeds to the gaming device. The gaming device utilizes the selected predetermined game outcome seeds in a random number generating algorithm to generate at least one and preferably a plurality of random numbers. The gaming device uses the generated random numbers that the seeds are deterministic of to determine the selected predetermined game outcome.

It should be appreciated that in this embodiment, if any one or more than one designated gaming devices configured for playing a certain game receive the same specific game outcome seed, the resulting random numbers generated (and thus the resulting game outcomes) will always be the same even though the different gaming devices operate independently from one another. That is, if a plurality of the same gaming devices each run the same game outcome seed through a predefined random number generating algorithm, each of such same gaming devices will generate the same series of random numbers that correspond to the same game outcomes.

In another embodiment, a predetermined game outcome is determined for each of a plurality of linked or networked gaming devices based on the results of a Bingo game. In this embodiment, each individual gaming device utilizes one or more Bingo games to determine the predetermined game outcome provided to the player for the interactive game played at that gaming device. In one embodiment, the Bingo game is displayed to the player. In another embodiment, the Bingo game is not displayed to the player, but the results of the Bingo game determine the predetermined game outcome for the interactive game.

In the various Bingo embodiments, as each gaming device is enrolled in the Bingo game, such as upon an appropriate wager or engaging an input device, the enrolled gaming device is provided a different Bingo card. Each Bingo card consists of a matrix or array of elements, wherein each element is designated with a separate indicia, such as a number. It should be appreciated that each different Bingo card includes a different combination of elements. For example, if four Bingo cards are provided to four enrolled gaming devices, the same element may be present on all four of the Bingo cards while another element may solely be present on one of the Bingo cards.

In operation of these embodiments, upon providing a different Bingo card to each of a plurality of enrolled gaming devices, the central controller randomly selects or draws, one at a time, a plurality of the elements. As each element is selected, each gaming device determines if the selected element is present on the Bingo card provided to that enrolled gaming device. If the selected element is present on the Bingo card provided to that enrolled gaming device, that gaming device marks or flags the selected element on the provided Bingo card. This process of selecting elements and marking any selected elements on the provided Bingo cards continues until one or more predetermined patterns are marked on one or more of the provided Bingo cards. It should be appreciated that in one embodiment, the gaming device requires the player to engage a "daub" button (not shown), in order to initiate the process of the gaming device marking or flagging any selected elements.

After one or more predetermined patterns are marked on one or more of the provided Bingo cards, a game outcome is determined for each of the enrolled gaming devices based, at least in part, on the selected elements on the provided Bingo cards. As described above, the game outcome each gaming device determines for the Bingo game is utilized by that gaming device to determine the predetermined game outcome provided to the player in the displayed interactive game. For example, a first gaming device to mark selected elements in a predetermined pattern is provided a first outcome of win $10 which will be provided to a first player in a first interactive game regardless of how the first player plays in the first interactive game and a second gaming device to mark selected elements in a different predetermined pattern is provided a second outcome of win $2 which will be provided to a second player in a second interactive game regardless of how the second player plays the provided second interactive game. It should be appreciated that as the process of marking selected elements continues until one or more predetermined patterns are marked, this embodiment insures that at least one Bingo card will win the Bingo game and thus at least one enrolled gaming device will provide a predetermined winning game outcome to a player in an interactive game.

After selecting, determining or receiving the predetermined game outcome, the gaming device provides a primary game outcome based on the selected predetermined game outcome as indicated in block 106. That is, the gaming device enables the player to play a primary game wherein the selected predetermined game outcome is utilized to determine a primary game outcome.

In one embodiment, the primary game outcome is either a win outcome with an associated value or payout that triggers a secondary or bonus game, a win outcome with an associated value or payout that does not trigger a secondary or bonus game, a lose outcome with no associated value or payout that does not trigger a secondary or bonus game or a secondary or bonus game qualifying condition or triggering event outcome with no associated value or payout in the primary game.

In this embodiment, after providing the primary game outcome, the gaming device determines if the provided primary game outcome triggers a player interactive secondary game, such as an offer and acceptance type secondary game as indicated by diamond 108. If the primary game outcome does not trigger a secondary game, the gaming device provides the player the selected predetermined game outcome and game play ends as indicated in block 120. That is, if the selected predetermined game outcome is a primary game win outcome with an associated value that does not trigger a secondary game, the player is provided the value associated with the selected predetermined game outcome and game play ends. Moreover, if the selected predetermined game outcome is a primary game lose outcome with no associated value that does not trigger a secondary game, the game play ends without providing the player any value.

If the provided primary game outcome triggers a player interactive secondary game, such as an offer and acceptance type secondary game, (i.e., either a win outcome with an associated value that triggers a secondary game win or a secondary game qualifying or triggering outcome with no associated value in the primary game), the gaming device initiates a player interactive secondary game.

In one embodiment wherein the interactive game is an offer and acceptance type game, upon the initiation of the offer and acceptance type game, the gaming device determines a plurality of available offers as indicated in block 110. Each of the determined offers is based on the selected predetermined game outcome. The gaming device utilizes the payout associated with the selected predetermined game outcome to determine a plurality of offers which, if accepted, may be modified by an appropriate multiplier to result in a modified offer equal to the payout associated with the selected predetermined game outcome. For example, as illustrated in FIG. 4A, based on the selected predetermined game outcome of win $150, the gaming device determines a plurality of potential offers 124 of five, ten, fifteen, thirty, fifty and seventy-five. As described in more detail below, each of the potential offers, when modified by an appropriate modifier, forms a modified offer equal to the selected predetermined game outcome value.

In one embodiment, one or more of the plurality of offers are preferably less than the payout associated with the selected predetermined game outcome. In another embodiment, each of the offers is preferably less than the payout associated with the selected predetermined game outcome. In these embodiments, if an accepted offer is less than the selected predetermined game outcome value, the gaming device must utilize a multiplier greater than one (and preferably an integer) to increase the accepted offer and thus form a modified offer equal to the selected predetermined game outcome value. On the other hand, one, more or each of the plurality of offers may be greater than the payout associated with the selected predetermined game outcome. In these embodiments, if an accepted offer is greater than the selected predetermined game outcome value, the gaming device must utilize a multiplier less than one to decrease the accepted offer and thus form a modified offer equal to the selected predetermined game outcome value.

In one embodiment, each of the plurality of offers are different. In another embodiment, a plurality of the offers are different. In another embodiment, each of the plurality of offers are the same. In different embodiments, the number of determined offers is predetermined, randomly determined, determined based on the player's wager, determined based on play of a sub-game or determined based on any other suitable manner.

In one embodiment, after determining the plurality of potential offers, the gaming device determines a plurality of applicable offer multipliers as indicated in block 112 of FIG. 3. Each offer multiplier is based on the selected predetermined game outcome and a different one of the determined potential offers. For each determined potential offer, the gaming device determines what multiplier must be applied to that potential offer to yield a modified offer equal to the payout associated with the selected predetermined game outcome. In one embodiment, the gaming device determines each of the plurality of offer multipliers by dividing the selected predetermined game outcome by each of the determined potential offers. For example, as illustrated in FIG. 4A, based on the selected predetermined game outcome of win $150 and the determined potential offers, the gaming device determines the applicable multipliers 126 of thirty, fifteen, ten, five, three and two. In this example, the potential offers of five, ten, fifteen, thirty, fifty and seventy-five modified by the applicable multipliers of thirty, fifteen, ten, five, three and two, respectively, yield the same modified offer which is equal to the payout of the selected predetermined game outcome. In one embodiment, the gaming device associates each determined potential offer with the determined multiplier that results in a modified offer equal to the payout of the selected predetermined game outcome. For example, the gaming device would associate the potential offer of five with the determined multiplier of thirty and also associate the potential offer of ten with the determined multiplier of fifteen.

FIG. 4B illustrates another example of determining a plurality of potential offers and a plurality of offer multipliers based on a selected predetermined game outcome. In this example, if a predetermined game outcome of win eighty 128 is selected, the gaming device determines a plurality of potential offers 130 of eight, ten, sixteen, twenty, forty and eighty. Additionally, based on the selected predetermined game outcome of win $80 and the determined potential offers of eight, ten, sixteen, twenty, forty and eighty, the gaming device determines the applicable multipliers 132 of ten, eight, five, four, two and one, respectively. As described above, the selected predetermined game outcome is the product of one of the potential offers and an appropriate one of the determined multipliers. For example, the potential offer of ten coupled with the multiplier of eight as well as the potential offer of two coupled with the multiplier of forty both yield the selected predetermined game outcome of eighty.

In one embodiment, after determining the plurality of potential offers and the plurality of applicable multipliers, the gaming device enables the player to play any suitable type of offer and acceptance game utilizing the determined plurality of offers as indicated in block 114 of FIG. 3. That is, the gaming device offers the player one of the plurality of determined offers for acceptance or rejection. If the player rejects the offer, the gaming device offers the player another one of the plurality of determined offers to accept or reject. This process continues until either the player accepts one of the plurality of determined offers or the player is offered the last determined offer which the player must accept. It should be appreciated that any suitable game wherein a player is enabled to interact and make at least one choice or decision that influences the outcome of the game may be implemented with the present invention.

Figure 5A:
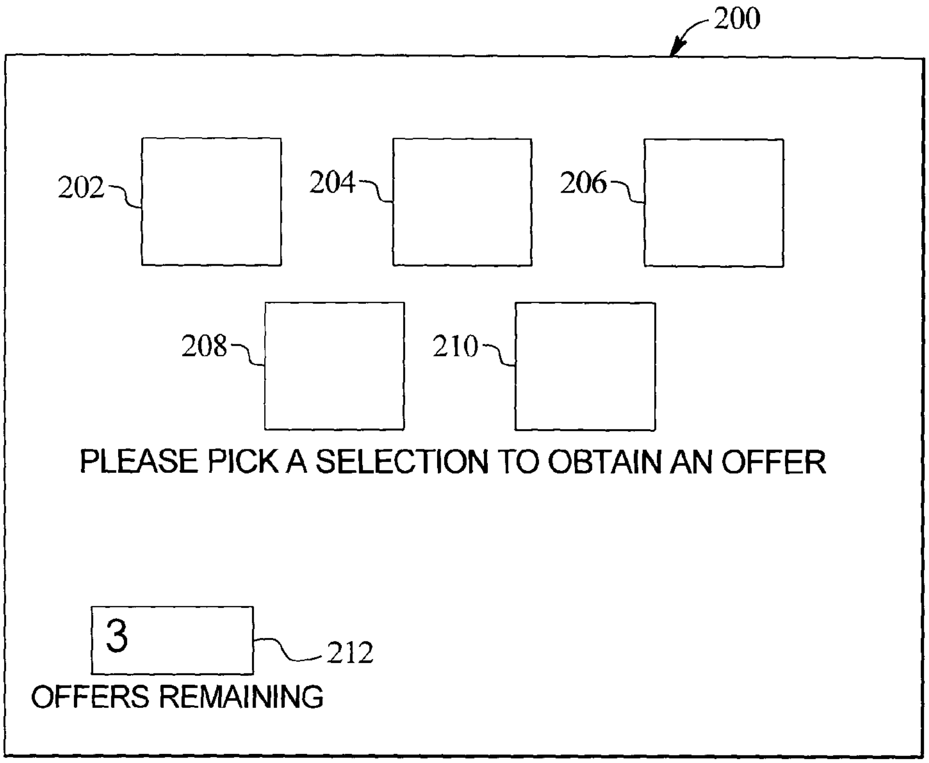
FIGS. 5A to 5D are front elevational views of one embodiment of the present invention illustrating one offer and acceptance game utilizing the plurality of derived offers.

Referring now to FIG. 5A, in one embodiment of an offer and acceptance game employed in the present invention, the gaming device provides a screen or display 200 which enables the player to make selections to obtain or be offered the offers. The gaming device provides a plurality of selections 202, 204, 206, 208 and 210. The gaming device provides a "Picks Remaining" indicator 212 which indicates a number of picks of the selections provided to the player, in this case three. The number of picks of the selections may be randomly determined, predetermined, determined based on the number of selections, determined based on the selected predetermined game outcome or determined in any suitable manner.

The gaming device associates each of the selections with one of the determined offers. In one embodiment, the gaming device associated each of the offers with a different selection. In another embodiment, the gaming device associates one offer with a plurality of selections. In another embodiment, the gaming device associates less than all of the generated offers with the plurality of selections. In another embodiment, the gaming device does not initially associate any determined offer with any selection, but rather reveals one of the determined offers as associated with one of the selections upon the player picking one of the selections.

The gaming device enables the player to pick one of the plurality of selections. Appropriate messages such as "PLEASE PICK A SELECTION TO OBTAIN AN OFFER" may be provided to the player visually or though suitable audio or audio-visual displays.

In another embodiment, the gaming device utilizes one or more mechanical devices, such as a wheel or reel, to generate each of the plurality of determined offers in an offer and acceptance game. In another embodiment, the gaming device utilizes one or more dynamic lighting schemes to generate each of the plurality of determined offers in an offer and acceptance game. It should be appreciated that any suitable scheme or mechanism which is adapted to generate a plurality of determined offers and enable a player to sequentially accept or reject the generated offers may be implemented in accordance with the present invention.

Figure 5B:
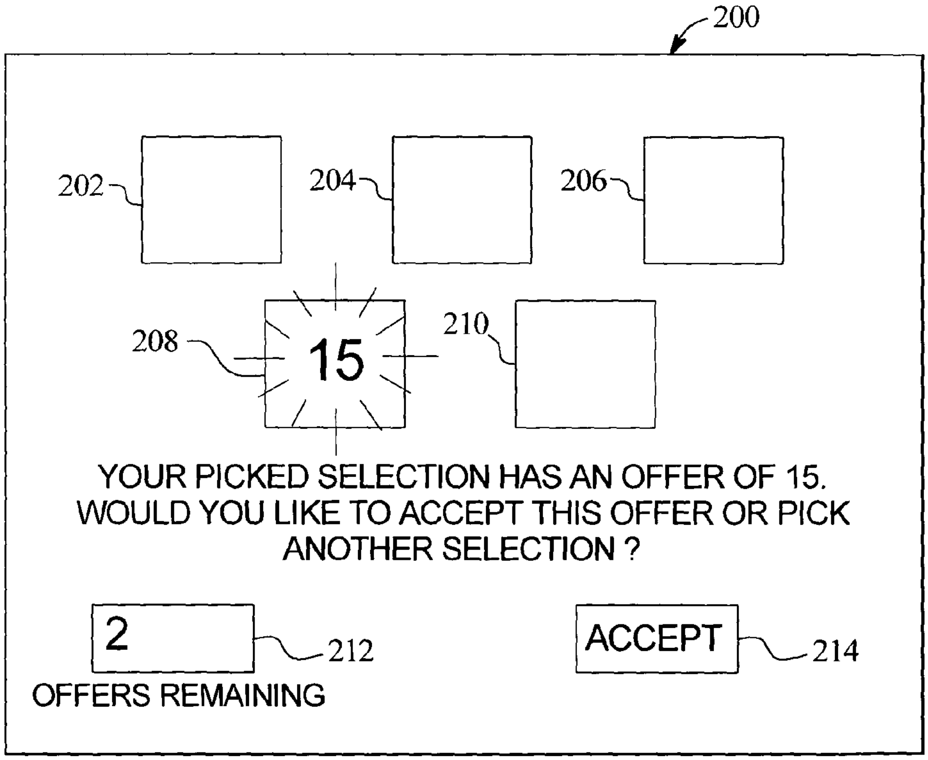

As illustrated in FIG. 5B, the player picked highlighted selection 208. The player's number of picks is reduced by one to two as indicated in the offers remaining indicator and the player's picked selection is revealed to be associated with an offer of fifteen 216. It should be appreciated that the offer of fifteen is one of the plurality of potential offers previously determined based on the selected predetermined game outcome. As the player has more than one pick remaining, the player is enabled to accept the offer using an accept indicator 214 or reject the revealed offer by picking another selection or using a reject indicator (not shown). Appropriate messages such as "YOUR PICKED SELECTION HAS A VALUE OF 15" and "WOULD YOU LIKE TO ACCEPT THIS OFFER OR PICK ANOTHER SELECTION?" may be provided to the player visually or though suitable audio or audio-visual displays.

Figure 5C:
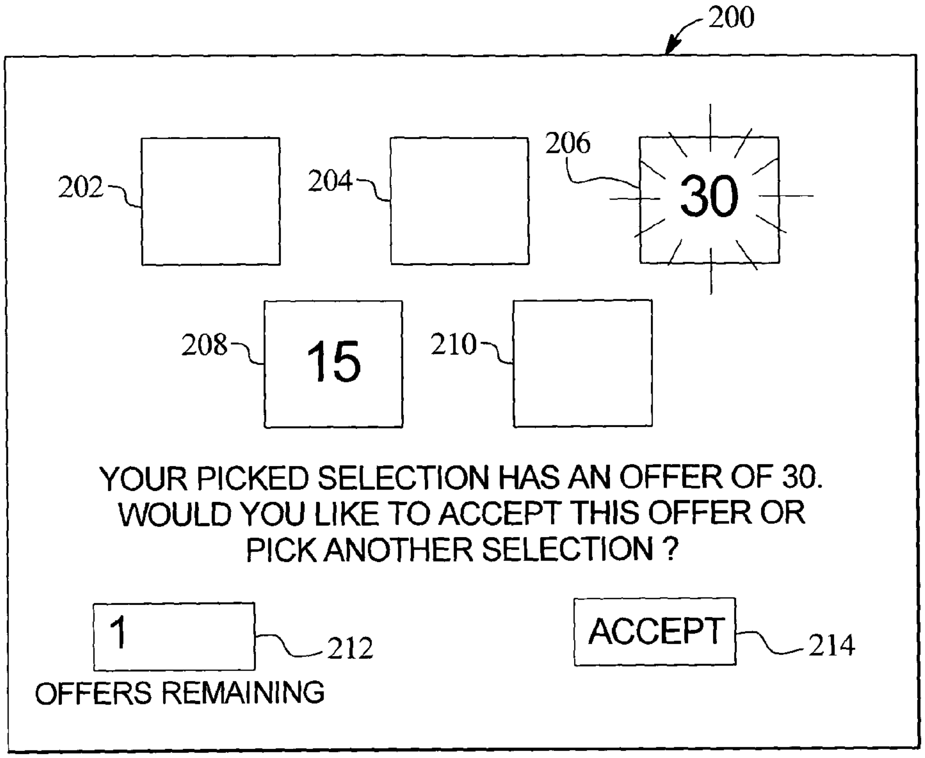

As illustrated in FIG. 5C, the player chose not to accept the offer of fifteen and to pick another selection. The player next picked highlighted selection 206. The player's number of picks is reduced by one and the player's picked selection is revealed to be associated with an offer thirty 218. Again, the offer of thirty is one of the plurality of potential offers previously determined based on the selected predetermined game outcome. As the player has more than one pick remaining, the player is again enabled to accept or reject the revealed offer of thirty. Appropriate messages such as "YOUR PICKED SELECTION HAS A VALUE OF 30" and "WOULD YOU LIKE TO ACCEPT THIS OFFER OR PICK ANOTHER SELECTION?" may be provided to the player visually or though suitable audio or audio-visual displays.

Figure 5D:
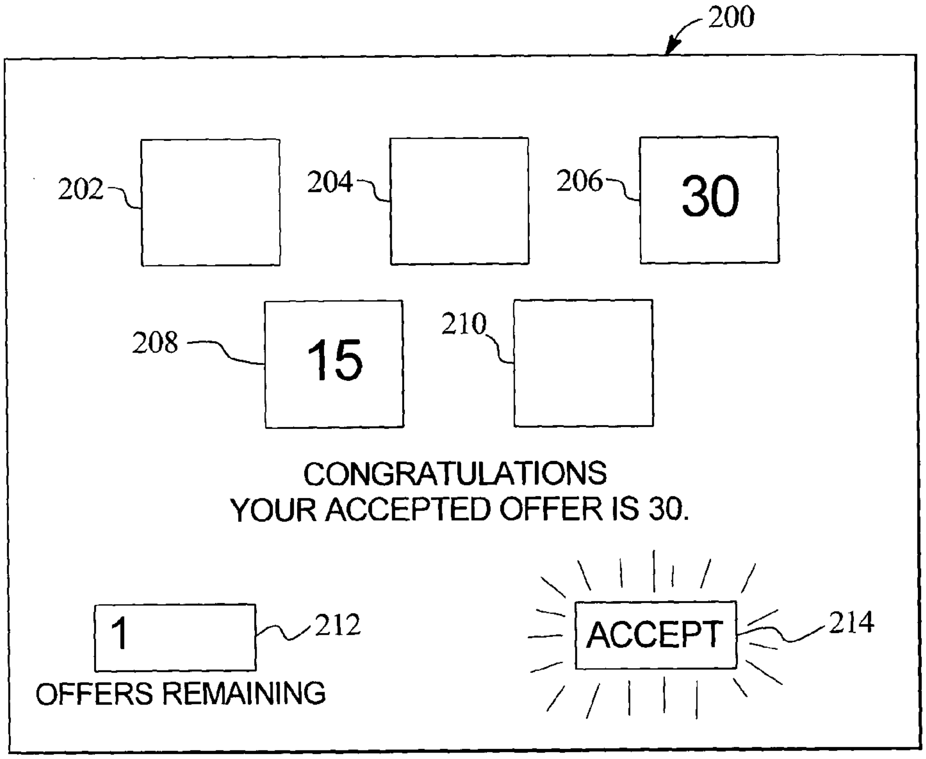

As illustrated in FIG. 5D, utilizing the highlighted accept indicator 214, the player accepted the offer of thirty. In one embodiment (not shown), after the player accepts an offer, the gaming device reveals which offer is associated with the remaining unpicked selections. This provides the player an additional level of excitement because the player can view what their offer would have been if they had picked a different selection. Appropriate messages such as "CONGRATULATIONS" and "YOUR AWARD IS 30" may be provided to the player visually or though suitable audio or audio-visual displays.

After the player accepts an offer, the gaming device selects one of the determined multipliers based on the accepted offer and the selected predetermined game outcome as indicated by block 116 of FIG. 3. That is, the gaming device selects one of the plurality of applicable multipliers, that when applied to the accepted offer, results in a modified offer equal to the payout associated with the selected predetermined game outcome. In other words, regardless of which of the plurality of offers the player accepts, the gaming device will utilize one of the determined offer multipliers to guarantee that the modified accepted offer provided to the player equals the selected predetermined game outcome value.

The accepted offer is modified by the selected offer multiplier as indicated in block 118 to result in a modified offer equal to the payout associated with the selected predetermined game outcome. The selected predetermined game outcome is provided to the player and game play ends as indicated in block 120.

In one embodiment, the gaming device advances the player to play at least one supplemental game wherein the selected applicable multiplier is applied to the accepted offer in the supplemental game. In the supplemental game, regardless of any player interaction, the gaming device will apply the selected applicable multiplier to the accepted offer to result in the value associated with the selected predetermined game outcome.

In one embodiment, the supplemental game involves a degree of player interaction. In another embodiment, the supplemental game involves no player interaction. In other various embodiments, the supplemental game is the same as, similar to or completely different than the primary game or the secondary game. It should be appreciated that any supplemental game wherein the gaming device modifies a previously accepted offer may be employed with the present invention.

Figure 6A:
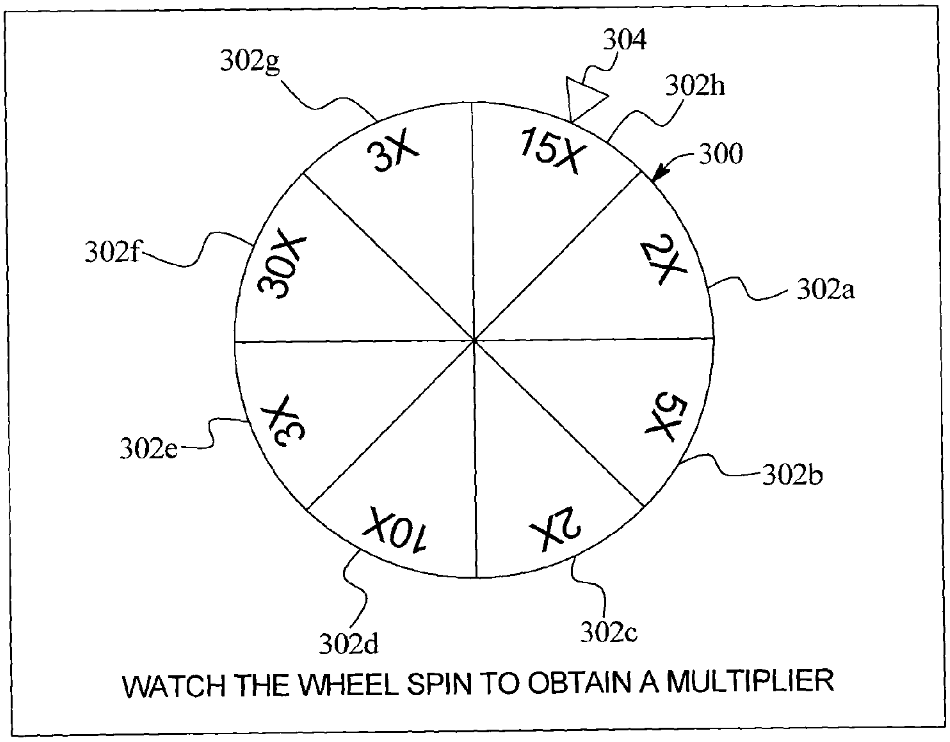
FIGS. 6A and 6B are front elevational view of one embodiment of the present invention illustrating a wheel utilized to provide the player a multiplier of the player's accepted offer.

After the player accepts an offer (or the last offer is automatically accepted), the gaming device utilizes one or more mechanical devices, such as a wheel, reel or die, to generate the selected offer multiplier. As illustrated in FIG. 6A, the gaming device includes a multiplier generator 300, such as a mechanical wheel which includes a plurality of sections 302*a* to 302*h*. Each section is associated with and displays one of a plurality of multipliers. For example, section 302*a* is associated with a multiplier of 2× and section 302*f* is associated with a multiplier of 30×. It should be appreciated that at least one of the displayed multipliers is the multiplier necessary to be applied to the accepted offer to yield a product equal to the payout of the selected predetermined game outcome. An indicator 304 such as a result pointer, is associated with the multiplier generator and adapted to identify each of the displayed sections of the multiplier generator. Appropriate messages such as "WATCH THE WHEEL SPIN TO OBTAIN A MULTIPLIER" may be provided to the player visually or though suitable audio or audio-visual displays.

Figure 6B:
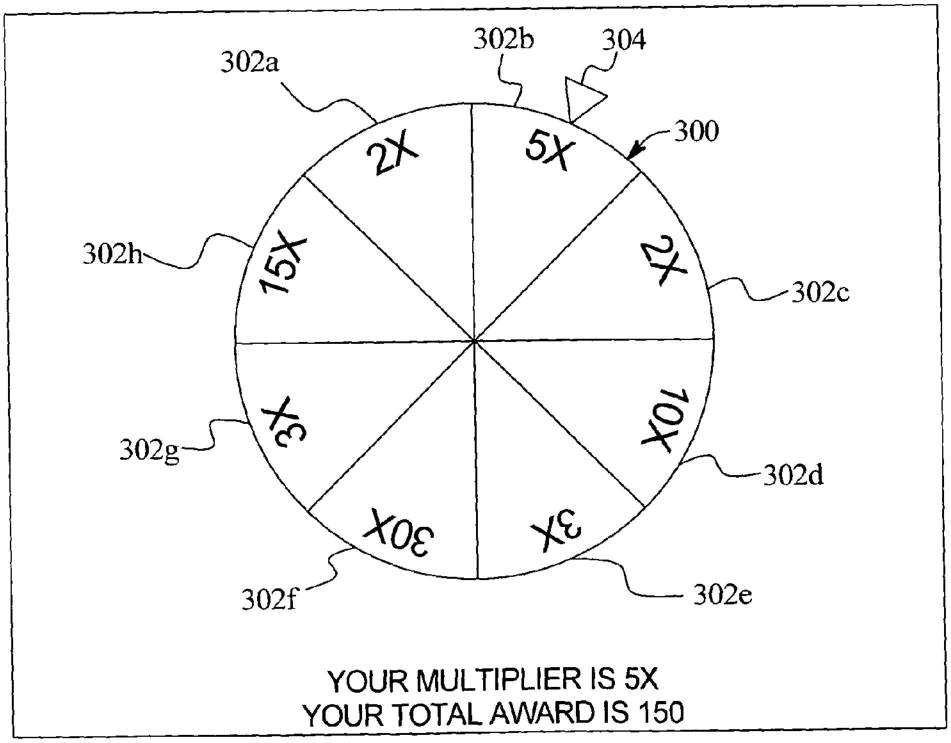

As illustrated in FIG. 6B, the gaming device activates the wheel to spin. The wheel spins and stops spinning to indicate section 302*b* which is associated with a multiplier of 5×. The gaming device modifies the accepted offer by the indicated offer multiplier and provides the modified accepted offer to the player. Appropriate messages such as "YOUR MULTIPLIER IS 5×" and "YOUR TOTAL AWARD IS 150" may be provided to the player visually or though suitable audio or audio-visual displays. It should be appreciated that even though a plurality of multipliers are displayed to the player, the gaming device stops the wheel to indicate a multiplier that when applied to the accepted offer yields an product equal to the selected predetermined game outcome. That is, as the payout associated with the selected predetermined game outcome must be provided to the player and an appropriate multiplier must be applied to the player's previously accepted offer to result in a modified offer equal to the payout associated with the selected predetermined game outcome, the wheel must stop to indicate the appropriate offer multiplier to yield a total payout equal to the selected predetermined game outcome.

In another embodiment, the gaming device initiates a supplemental selection game. In the supplemental selection game, the gaming device enables the player to pick one of a plurality of selections to obtain an offer multiplier. In this embodiment, the gaming device associates the selected offer multiplier with the picked selection. The gaming device reveals the associated offer multiplier, modifies the accepted offer by the revealed offer multiplier and provides the modified accepted offer to the player. It should be appreciated that regardless of which selection the player picked, as the payout associated with the selected predetermined game outcome must be provided to the player and the selected multiplier must be applied to the player's previously accepted offer to result in a modified offer equal to the payout associated with the selected predetermined game outcome, the selected offer multiplier will be provided to the player in the supplemental game.

In another alternative embodiment, after providing the player the revealed offer multiplier, the gaming device associates a plurality of offer multipliers with the remaining unpicked selections and reveals the associated multipliers with the remaining unpicked selections. By revealing the multipliers associated with the remaining unpicked selections may increase the player's level of excitement, the player is still being provided the same previously selected offer multiplier regardless of which selection is picked. In another embodiment, certain jurisdictional regulations prohibit displaying to the player any outcome (e.g., award or multiplier) that the player cannot possibly be provided and thus as the revealed multipliers cannot be provided to the player because only the determined multiplier can be provided to the player (to cause the accepted offer to be modified to result in a modified offer equal to the selected predetermined game outcome), no multiplier is revealed for any unpicked selection.

In another embodiment, the gaming device utilizes one or more dynamic lighting schemes to generate the selected offer multiplier. It should be appreciated that any suitable scheme or mechanism which is adapted to generate the selected offer multiplier may be implemented in accordance with the present invention.

In another embodiment, the gaming device splits the payout of the selected predetermined game outcome into a plurality of offers and multipliers. In this embodiment, the gaming device provides the player different portions of the total selected predetermined game outcome at different stages of one or more games. For example, if the payout of the selected predetermined game outcome is fifty-nine, the gaming device provides the player an award of twenty-four during a first game stage (dividing the payout of twenty-four into any appropriate offer and multiplier combination that yields a product of twenty-four) and an award of thirty-five during a second game stage (dividing the payout of thirty-five into any appropriate offer and multiplier combination that yields a product of thirty-five). It should be appreciated that the gaming device is operable to utilize one or more different mathematical functions (e.g., addition, subtraction, multiplication, division, reordering of digits) in one or more stages to yield a total payout equal to the payout associated with the selected predetermined game outcome.

Figure 7:
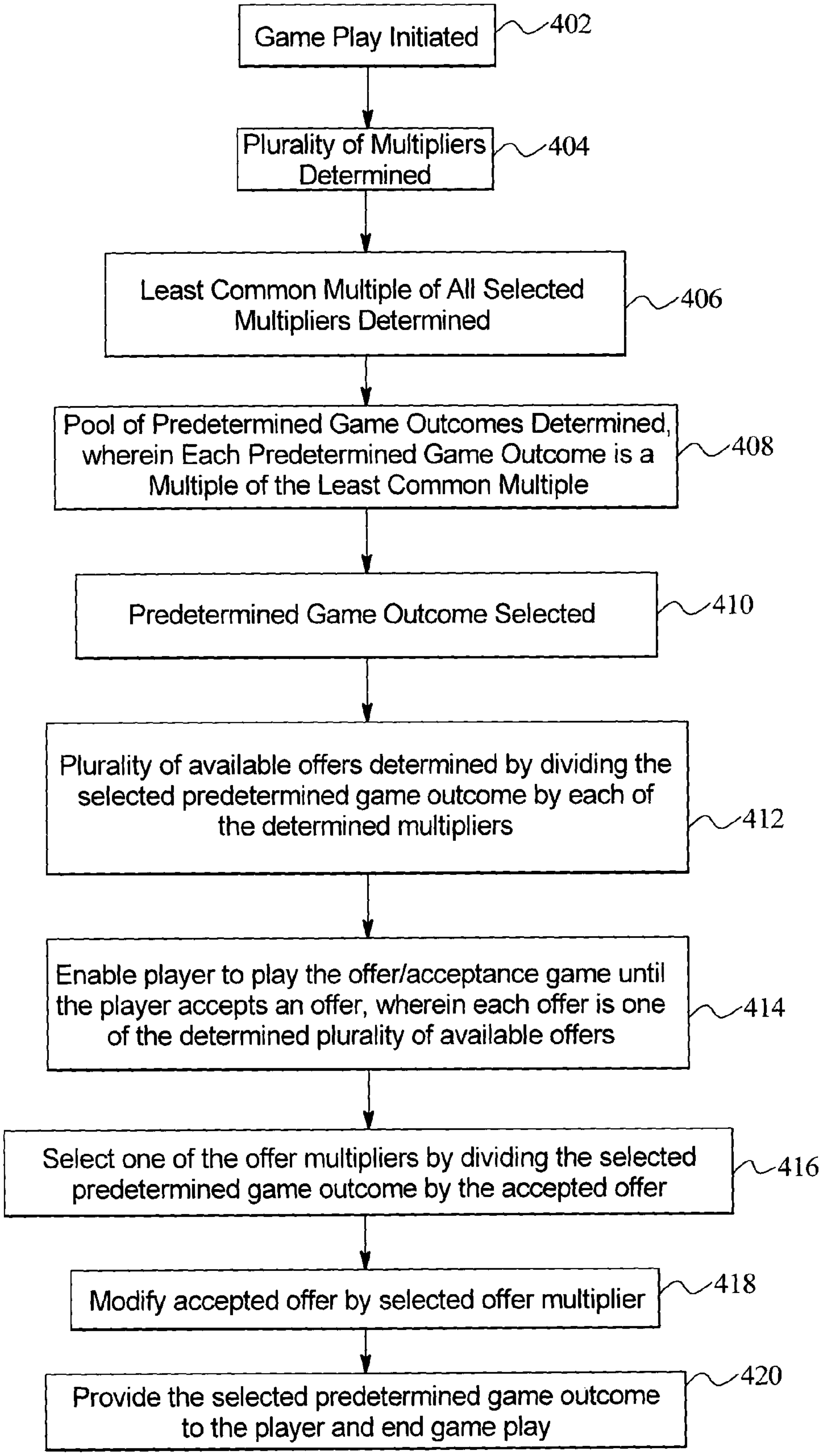
FIG. 7 is a schematic block diagram illustrating another embodiment of the present invention wherein a predetermined game outcome and a plurality of potential offers are determined based on a plurality of selected multipliers.

In another embodiment of providing a player a predetermined game outcome in an interactive offer and acceptance game, after the interactive game is initiated, a plurality of multipliers are determined as indicated in blocks 402 and 404 of FIG. 7. In one embodiment, each of the multipliers is selected from one or more pools of multipliers. In another embodiment, each of the multipliers is selected from one or more ranges of multipliers. In another embodiment, each of the multipliers is associated with a probability and each of the multipliers is selected based on the associated probabilities. In different embodiments, the multipliers are predetermined, randomly determined, determined based on the player's wager in a primary game, determined from the occurrence of one or more symbols in a primary game or determined based on any other suitable method. After determining the plurality of multipliers, the least common multiple of all of the multipliers is determined as indicated in block 406. A set or pool of predetermined game outcomes which are each a multiple of the least common multiplier is formed as indicated in block 408. For example, if the determined multipliers are one, two, three and four, the determined least common multiple is twelve and thus all of the predetermined game outcomes must be multiples of twelve (e.g., twelve, twenty-four, thirty-six).

One of the predetermined game outcomes from the formed set of predetermined game outcomes is selected as indicated in block 410 and the selected predetermined game outcome is divided by each of the determined multipliers to determine the plurality of offers which may be provided to the player in the interactive game as indicated in block 412. For example, if the selected predetermined game outcome of win sixty is selected, the value of sixty is divided by the multipliers of one, two, three and four to determine the available offers of sixty, thirty, twenty and fifteen, respectively.

Figure 8:
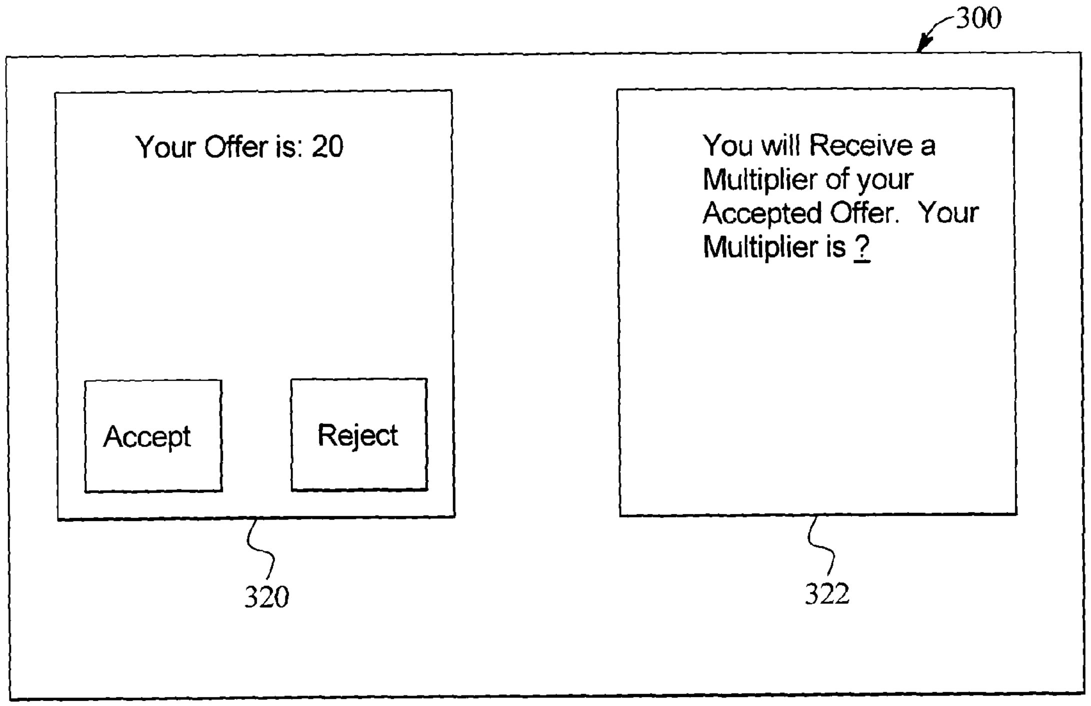
FIG. 8 is a front elevational view of another embodiment of the present invention illustrating an offer and acceptance game wherein offer multiplier information is displayed to the player.

As described above, after determining the potential offers, the gaming device enables the player to play any suitable type of offer and acceptance game utilizing the determined plurality of offers as indicated in block 414. For example, as illustrated in FIG. 8, the gaming device selects the determined potential offer of twenty and enables the player to accept or reject the selected offer using the appropriate accept indicator or reject indicator 320. In this embodiment, the gaming device also informs the player that they will receive a multiplier of any accepted offer, but does not reveal the provided multiplier until after an offer is accepted (or a final offer is automatically accepted) 322. As described above, as the modified offer must equal the payout associated with the selected predetermined game outcome, the offer multiplier utilized to form the modified offer can only be determined and revealed after an offer is accepted.

After one of the offers is accepted (or the final offer is automatically accepted), the gaming device selects one of the offer multipliers by dividing the selected predetermined game outcome by the accepted offer as indicated in block 416. As the accepted potential offer is based on both the selected predetermined game outcome and one of the determined multipliers, the selected predetermined game outcome divided by the accepted offer will result in one of the previously determined multipliers. The accepted offer is modified by the selected offer multiplier, the selected predetermined game outcome is provided to the player and the game play ends as indicated in blocks 418 and 420.

In another embodiment, rather than determining a plurality of offer multipliers prior to enabling the player to play the offer/acceptance game, the gaming device enables the player to play the offer/acceptance game and then determines an appropriate offer multiplier based on the accepted offer and the selected predetermined game outcome. In this embodiment, the gaming device determines a modifier that must be applied to that potential offer to yield a modified offer equal to the payout associated with the selected predetermined game outcome and the game proceeds as described above with the determined modifier.

In another embodiment, the gaming device utilizes a plurality of accepted offers and a plurality of multipliers to form a total modified offer which is equal to the selected predetermined game outcome value. In one embodiment, the gaming device enables the player to accept a plurality of offers. In this embodiment, after accepting the plurality of offers, the gaming device determines an offer multiplier which when applied to the plurality of accepted offers yields a total modified offer equal to the selected predetermined game outcome value. In another embodiment, the gaming device provides the player a plurality of offer multipliers. In this embodiment, after accepting an offer, the gaming device determines the plurality of offer multipliers which when applied to the accepted offer yields a total modified offer equal to the selected predetermined game outcome value. In another embodiment, the gaming device enables the player to accept a plurality of offers and provides the player a plurality of offer multipliers. In this embodiment, after accepting the plurality of offers, the gaming device determines a plurality of offer multipliers which when applied to the plurality of accepted offers yields a total modified offer equal to the selected predetermined game outcome value.

In another embodiment, the gaming device enables the player to play the offer multiplier supplemental game prior to enabling the player to play the offer and acceptance interactive game. In this embodiment, the gaming device provides a plurality of selections wherein none of the selections are associated with an offer multiplier. The player is enabled to pick one of a plurality of selections, but unlike the selection game described above, no offer multiplier is displayed as associated with the picked selection. In one embodiment, the player picked selection is displayed as moving to a designated area of the screen, such as a corner, where the player picked selection remains masked until any associated offer multiplier is revealed to the player. In another embodiment, any suitable manner of displaying the masked player picked selection may be employed in accordance with the present invention. The gaming device then proceeds to enable the player to play the interactive offer and acceptance game as described above. After accepting an offer in the interactive offer and acceptance game, the appropriate offer multiplier which, when applied to the accepted offer, yields a modified offer equal to the payout or value associated with the selected predetermined game outcome is associated with the player's previously picked selection and is subsequently revealed to the player.

In an alternative embodiment, rather than enabling the player to accept or reject potential offers and determining an offer multiplier by dividing the accepted or final offer by the selected predetermined game outcome, the gaming device enables the player to accept or reject potential offer multipliers. In this embodiment, after the player accepts a potential offer multiplier (or a final potential offer multiplier is automatically accepted), the gaming device determines a value amount to modify by the accepted or final offer multiplier. The gaming device divides the selected predetermined game outcome by the accepted or final offer multiplier to determine the value amount which must be provided to the player and subsequently modified by the accepted or final offer multiplier to result in a modified offer equal to the selected predetermined game outcome value. For example, if a predetermined game outcome of one-hundred is selected and the player accepts an offer multiplier of ten (after previously rejecting offer multipliers of twenty and two), the gaming device determines a value amount of ten to provide to the player. In this example, the provided value amount of ten, when multiplied by the accepted offer multiplier of ten, yields a modified value amount of one-hundred which equal the selected predetermined game outcome value.

Another method of providing the player a predetermined game outcome in an offer and acceptance type game includes modifying the payout or value associated with the selected predetermined game outcome to result in a maximum offer which is less than the value or payout associated with the selected predetermined game outcome. The maximum offer represents the highest offered value or payout that may be offered to and accepted by the player in the offer and acceptance game. For example, if the value associated with the selected predetermined game outcome is eighty-five, the value of eighty-five may be modified by subtracting an amount of ten to determine a range of offers with the maximum offer in the range being seventy-five. It should be appreciated that by setting the maximum value that the player may obtain in the offer and acceptance game as a value less than the value associated with the selected predetermined game outcome, this method insures that the player advances to at least one supplemental game in order to provide the player the complete value associated with the selected predetermined game outcome.

In one alternative method, the determination of the maximum offer involves the subtraction of one or more variables from the value associated with the selected predetermined game outcome to determine a maximum offer. In one alternative method, the variable is a percentage of the value associated with the selected predetermined game outcome. In another method, the variable is a predetermined amount which is selected based on the value associated with the selected predetermined game outcome. It should be appreciated that any suitable mathematical formula which results in an appropriate maximum offer may be implemented.

In another method, after determining the maximum offer, a plurality of offers in the range are randomly generated wherein none of the determined offers exceed the maximum offer. That is, each of the plurality of offers is either less than or equal to the maximum offer. Following the example above, a plurality of offers that are each valued less than or equal to the maximum offer of seventy-five may be determined, such as offers of fifteen, twenty, thirty-five, forty, fifty, sixty-five, and seventy-five.

In an alternative method, after determining the plurality of offers, the player is enabled to play any suitable offer and acceptance game utilizing the determined plurality of offers. The player is offered one of the plurality of offers for acceptance or rejection. If the player rejects the offer and the player has at least one offer remaining (i.e., the offer is not the last offer), the player is offered another one of the plurality of offers to accept or reject. This process continues until either the player accepts one of the plurality of offers or the player is offered the last offer which the player must accept.

When the player accepts an offer, the player automatically advances to at least one supplemental game. In the supplemental game, the supplemental value provided to the player is the difference between the value of the accepted offer and the value associated with the selected predetermined game outcome. In one alternative method, the player is enabled to play a plurality of supplemental games, wherein the total award provided to the player for the plurality of supplemental games is the difference between the value of the accepted offer and the value associated with the selected predetermined game outcome.

In an alternative method, the player is enabled to obtain a value or payout in the interactive game that is equal to the value associated with the selected predetermined game outcome. In this method, a terminator or other award of zero value is provided in the supplemental game. That is, if the player is provided a payout or value in the interactive game which is equal to the value associated with the selected predetermined game outcome, the player is advanced to at least one supplemental game wherein the player will obtain a terminator or other award valued at zero.

In another alternative method, the supplemental game is a selection game. In another method, one or more mechanical devices, such as a wheel or reel, is utilized to generate a supplemental game award. In another method, one or more dynamic lighting schemes is utilized to generate a supplemental game award. It should be appreciated that any suitable game or mechanism which is adapted to generate an award equal to the difference, if any, between the value of the accepted offer and the value associated with the selected predetermined game outcome may be employed as the supplemental game.

By coupling a player interactive game wherein any payouts provided to the player are valued less than the value associated with the selected predetermined game outcome with at least one supplemental game which provides the player a supplemental value representing the difference between the provided payout in the interactive game and the value associated with the selected predetermined game outcome, a player is provided an interactive game that is operational with predetermined game outcomes (i.e., that guarantees the predetermined game outcome is provided to the player).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a housing;

a plurality of input devices supported by the housing, said plurality of input devices including:

(i) an acceptor, (ii) a validator, and (iii) a cashout device;

a display device supported by the housing; and a processor configured to operate with said display device and said input devices to:

(a) if a physical item is received via the acceptor:

(i) identify, via the validator, the received physical item, and (ii) establish a credit balance based, at least in part, on a monetary value associated with the received and identified physical item, (b) for each play of an interactive game:

(i) receive data indicating a predetermined game award, wherein said predetermined game award is determined prior to any placement of any wager associated with said play of the interactive game;

(ii) prior to selecting and displaying any multipliers to modify any accepted or final offers:

(A) determine a plurality of offers based on said received predetermined game award, wherein if data indicating a first predetermined game award is received, a first plurality of offers are determined based on the first predetermined game award and if data indicating a second, different predetermined game award is received, a second, different plurality of offers are determined based on the second, different game award;

(B) after determining the plurality of offers, determine a plurality of different multipliers, wherein each multiplier is based on said received predetermined game award and a different one of said plurality of determined offers;

(C) display one of said determined plurality of offers;

(D) after displaying one of said plurality of determined offers, receive an input to accept or reject said displayed offer; and (E) after receiving the input to accept or reject said displayed offer, repeat steps (C) to (E) if said displayed offer is rejected, wherein steps (C) to (E) are repeated until another one of said determined offers is accepted or said displayed offer is a final offer; and (iii) after receiving the input to accept or reject said displayed offer, if said displayed offer is accepted or said displayed offer is the final offer:

(A) select and display one of said determined multipliers, wherein a product of said determined multiplier and said accepted offer or displayed final offer is said received predetermined game award, (B) modify said accepted or displayed final offer by said selected multiplier, and (C) provide said modified offer, wherein said modified offer is equal to the received predetermined game award; and (c) if a cashout input is received via the cashout device, cause an initiation of any payout associated with the credit balance.

2. The gaming device of claim 1, wherein said predetermined game award divided by said accepted offer or displayed final offer results in said selected determined multiplier.

3. The gaming device of claim 1, wherein each one of said potential offers multiplied by at least one of said determined multipliers yields said predetermined game award.

4. The gaming device of claim 1, wherein said predetermined game award is selected from a plurality of predetermined game awards such that said selected predetermined game award is prevented from further selection from said plurality of predetermined game awards.

5. The gaming device of claim 1, wherein said data indicating said predetermined game award is received from a memory device of said gaming device.

6. The gaming device of claim 1, wherein said data indicating said predetermined game award is received from a central controller.

7. The gaming device of claim 1, wherein said interactive game is a bonus game.

8. The gaming device of claim 1, wherein said determined multiplier is displayed utilizing one of the group consisting of a wheel, a reel and a die.

9. The gaming device of claim 1, wherein said processor is configured to operate to associate said plurality of offers with a plurality of selections, receive an input of a pick of one of said selections and reveal the offer associated with the picked selection as the displayed offer to accept or reject.

10. A gaming device comprising:

a housing;

a plurality of input devices supported by the housing, said plurality of input devices including:

(i) an acceptor, (ii) a validator, and (iii) a cashout device;

a display device supported by the housing; and a processor configured to operate with said display device and said input devices to:

(a) if a physical item is received via the acceptor:

(i) identify, via the validator, the received physical item, and (ii) establish a credit balance based, at least in part, on a monetary value associated with the received and identified physical item, (b) for each play of an interactive game:

(i) receive data indicating a predetermined game award, wherein said predetermined game award is determined prior to any placement of any wager associated with said play of the interactive game;

(ii) prior to determining and displaying any multipliers to modify any accepted or final offers:

(A) determine a plurality of offers based on said received predetermined game award, wherein if data indicating a first predetermined game award is received, a first plurality of offers are determined based on the first predetermined game award and if data indicating a second, different predetermined game award is received, a second, different plurality of offers are determined based on the second, different game award;

(B) after determining the plurality of offers, displaying one of said plurality of determined offers;

(C) after displaying one of said plurality of determined offers, receive an input to accept or reject said displayed offer; and (D) after receiving the input to accept or reject said displayed offer, if said displayed offer is rejected, repeating steps (B) to (D) until another one of said determined offers is accepted or said displayed offer is a final offer; and (iii) after receiving the input to accept or reject said displayed offer, if said displayed offer is accepted or said displayed offer is the final offer:

(A) determine and display a multiplier, wherein a product of the determined multiplier and the accepted offer or displayed final offer is said received predetermined game award, (B) modify said accepted offer or displayed final offer by said determined multiplier, and (C) provide said modified offer, wherein said modified offer is equal to said received predetermined game award; and (c) if a cashout input is received via the cashout device, cause an initiation of any payout associated with the credit balance.

11. The gaming device of claim 10, wherein said multiplier is determined by dividing said predetermined game award by said accepted offer or displayed final offer.

12. The gaming device of claim 10, wherein said predetermined game award is selected from a plurality of predetermined game awards such that said selected predetermined game award is prevented from further selection from said plurality of predetermined game awards.

13. The gaming device of claim 10, wherein said data indicating said predetermined game award is received from a memory device of said gaming device.

14. The gaming device of claim 10, wherein said data indicating said predetermined game award is received from a central controller.

15. The gaming device of claim 10, wherein said interactive game is a bonus game.

16. The gaming device of claim 10, wherein said determined multiplier is displayed utilizing one of the group consisting of a wheel, a reel and a die.

17. The gaming device of claim 10, wherein said processor is configured to associate said plurality of offers with a plurality of selections, receive an input of a pick of one of said selections and reveal the offer associated with the picked selection as the displayed offer to accept or reject.

18. A gaming device comprising:

a housing;

a plurality of input devices supported by the housing, said plurality of input devices including:

(i) an acceptor, (ii) a validator, and (iii) a cashout device;

a display device supported by the housing; and a processor configured to operate with said display device and said input devices to:

(a) if a physical item is received via the acceptor:

(i) identify, via the validator, the received physical item, and (ii) establish a credit balance based, at least in part, on a monetary value associated with the received and identified physical item, (b) for each play of an interactive game:

(i) receive data indicating a predetermined game award, wherein said predetermined game award is determined prior to any placement of any wager associated with said play of the interactive game;

(ii) determine a plurality of offers by dividing the received predetermined game award by each of a plurality of multipliers, wherein if data indicating a first predetermined game award is received, a first plurality of offers are determined by dividing the first predetermined game award by each of the plurality of multipliers and if data indicating a second, different predetermined game award is received, a second, different plurality of offers are determined by dividing the second predetermined game award by each of the plurality of multipliers;

(iii) after determining the plurality of offers and prior to modifying any accepted offers by any multipliers, receive inputs to accept or reject said determined offers until one of said determined offers is accepted;

(iv) after receiving the inputs to accept or reject said displayed offers until one of said determined offers is accepted, select one of said multipliers by dividing the received predetermined game award by said accepted offer;

(v) modify the accepted offer by the selected multiplier; and (vi) provide the modified accepted offer to the player, wherein said modified accepted offer equals said received predetermined game award; and (c) if a cashout input is received via the cashout device, cause an initiation of any payout associated with the credit balance.

19. The gaming device of claim 18, wherein each predetermined game award is a multiple of a least common multiple of all of the plurality of multipliers.

20. The gaming device of claim 18, wherein said accepted offer is a final offer.

21. A gaming device comprising:

a housing;

a plurality of input devices supported by the housing, said plurality of input devices including;

(i) an acceptor, (ii) a validator, and (iii) a cashout device;

a processor; and a memory device which stores a plurality of instructions, which when executed by the processor, cause the processor to operate with a display device and the input devices to:

(a) if a physical item is received via the acceptor:

(i) identify, via the validator, the received physical item, and (ii) establish a credit balance based, at least in part, on a monetary value associated with the received and identified physical item, (b) for each play of a game:

(i) select a predetermined game award from a set of predetermined game awards such that said predetermined game award is prevented from further selection from said set of predetermined game awards, wherein said predetermined game award is determined prior to any placement of any wager associated with said play of the game;

(ii) prior to modifying any accepted offers by any multipliers, receive inputs to accept or reject a plurality of potential offers in said game, wherein each potential offer is divisible into the predetermined game award, and if a first predetermined game award is selected, each of the potential offers are divisible into the first predetermined game award and if a second, different predetermined game award is selected, each of the potential offers are divisible into the second, different game award;

(iii) determine a modifier of the accepted offer by dividing the predetermined game award by said accepted offer;

(iv) applying said determined modifier to the accepted offer after receiving any inputs to accept or reject said potential offers; and (v) providing the selected predetermined game award; and (c) if a cashout input is received via the cashout device, cause an initiation of any payout associated with the credit balance.

22. The gaming device of claim 21, wherein said accepted offer is a final offer.

23. A method of operating a gaming device, for each play of a game, said method comprising:

(a) receiving data indicating a predetermined game award, wherein said predetermined game award is determined prior to any placement of any wager associated with said play of the game;

(b) prior to selecting any multipliers to modify any accepted or final offers:

(i) determining a plurality of offers based on said received predetermined game award, wherein if data indicating a first predetermined game award is received, a first plurality of offers are determined based on the first predetermined game award and if data indicating a second, different predetermined game award is received, a second, different plurality of offers are determined based on the second, different game award;

(ii) after determining the plurality of offers, determining a plurality of different multipliers, wherein each multiplier is based on said received predetermined game award and a different one of said plurality of determined offers;

(iii) causing a display device to display one of said plurality of determined offers;

(iv) after causing the display device to display one of said plurality of determined offers receiving an input to accept or reject said displayed offer; and (v) after receiving the input to accept or reject said displayed offer, repeating steps (iii) to (v) if said displayed offer is rejected, wherein steps (iii) to (v) are repeated until another one of said determined offers is accepted or said displayed offer is a final offer; and (c) after receiving the input to accept or reject said displayed offer, if said displayed offer is accepted or said displayed offer is the final offer:

(i) selecting one of said determined multipliers, wherein a product of said determined multiplier and said accepted offer or displayed final offer is said received predetermined game award, (ii) causing the display device to display the selected multiplier, (iii) modifying said accepted offer or displayed final offer by said selected multiplier, and (iv) providing said modified offer, wherein:

(A) said modified offer is equal to said received predetermined game award, (B) a credit balance is increasable based on the received predetermined game award, and (C) said credit balance is:

(I) increasable via: (1) an acceptor of a physical item associated with a monetary value, and (2) a validator configured to identify the physical item, and (II) decreasable via a cashout device configured to receive an input to cause an initiation of a payout associated with the credit balance.

24. The method of claim 23, wherein said predetermined game award divided by said accepted offer or displayed final offer results in said selected determined multiplier.

25. The method of claim 23, wherein each one of said potential offers multiplied by at least one of said determined multipliers yields said predetermined game award.

26. The method of claim 23, wherein said predetermined game award is selected from a plurality of predetermined game awards such that said selected predetermined game award is prevented from further selection from said plurality of predetermined game awards.

27. The method of claim 23, wherein said determined multiplier is displayed utilizing one of the group consisting of a wheel, a reel and a die.

28. The method of claim 23, which includes associating said plurality of offers with a plurality of selections, receiving an input of a pick of one of said selections and revealing the offer associated with the picked selection as the displayed offer to accept or reject.

29. The method of claim 23, which is provided through a data network.

30. The method of claim 29, wherein the data network is an internet.

31. A method of operating a gaming device, for each play of a game, said method comprising:

(a) receiving data indicating a predetermined game award, wherein said predetermined game award is determined prior to any placement of any wager associated with said play of the game;

(b) prior to determining any multipliers to modify any accepted or final offers:

(i) determining a plurality of offers based on said received predetermined game award, wherein if data indicating a first predetermined game award is received, a first plurality of offers are determined based on the first predetermined game award and if data indicating a second, different predetermined game award is received, a second, different plurality of offers are determined based on the second, different game award;

(ii) after determining the plurality of offers, causing a display device to display one of said plurality of determined offers;

(iii) after causing the display device to display one of said plurality of determined offers, receiving an input to accept or reject said displayed offer; and (iv) after receiving the input to accept or reject said displayed offer, if said displayed offer is rejected, repeating steps (ii) to (iv) until another one of said determined offers is accepted or said displayed offer is a final offer; and (c) after receiving the input to accept or reject said displayed offer, if said displayed offer or is accepted said displayed offer is the final offer:

(i) determining a multiplier, wherein a product of said determined multiplier and the accepted offer or displayed final offer is said received predetermined game award, (ii) causing the display device to display the determined multiplier, (iii) modifying said accepted offer or displayed final offer by said determined multiplier, and
(iv) providing said modified offer, wherein:
(A) said modified offer is equal to said received predetermined game award,
(B) a credit balance is increasable based on the received predetermined game award, and
(C) said credit balance is:
(I) increasable via: (1) an acceptor of a physical item associated with a monetary value, and (2) a validator configured to identify the physical item, and
(II) decreasable via a cashout device configured to receive an input to cause a initiation of a payout associated with the credit balance.

32. The method of claim 31, wherein said multiplier is determined by dividing said predetermined game award by said accepted offer or displayed final offer.

33. The method of claim 31, wherein said predetermined game award is selected from a plurality of predetermined game awards such that said selected predetermined game award is prevented from further selection from said plurality of predetermined game awards.

34. The method of claim 31, wherein said determined multiplier is displayed utilizing one of the group consisting of a wheel, a reel and a die.

35. The method of claim 31, which includes associating said plurality of offers with a plurality of selections, receiving an input of a pick of one of said selections and revealing the offer associated with the picked selection as the displayed offer to accept or reject.

36. The method of claim 31, which is provided through a data network.

37. The method of claim 36, wherein the data network is an internet.

38. A method of operating a gaming device, for each play of a game, said method comprising:
(a) determining a plurality of predetermined game awards;
(b) selecting one of said predetermined game awards, wherein said predetermined game award is prevented from further selection and said selected predetermined game award is determined prior to any placement of any wager associated with said play of the game;
(c) determining a plurality of multipliers;
(d) determining a plurality of offers by dividing the selected predetermined game award by each of said determined multipliers, wherein if a first predetermined game award is selected, a first plurality of offers are determined by dividing the first predetermined game award by each of the determined multipliers and if a second, different predetermined game award is selected, a second, different plurality of offers are determined by dividing the second predetermined game award by each of the determined multipliers;
(e) after determining the plurality of offers and prior to selecting any multipliers to modify any accepted offers, receiving inputs to accept or reject said determined offers until one of said determined offers is accepted; and
(f) after receiving the inputs to accept or reject said determined offers until one of said determined offers is accepted:
(i) selecting one of said multipliers by dividing the selected predetermined game award by said accepted offer,
(ii) modifying the accepted offer by the selected multiplier,
(iii) causing a display device to display the modified accepted offer,
wherein said modified accepted offer equals said selected predetermined game award, and
(iv) providing the modified accepted offer, wherein:
(A) a credit balance is increasable based on the selected predetermined game award, and
(B) said credit balance is:
(I) increasable via: (1) an acceptor of a physical item associated with a monetary value, and (2) a validator configured to identify the physical item, and
decreasable via a cashout device configured to receive an input to cause an initiation of a payout associated with the credit balance.

39. The method of claim 38, wherein said accepted offer is a final offer.

40. The method of claim 38, wherein each predetermined game award is a multiple of a least common multiple of all of the plurality of multipliers.

41. The method of claim 38, which is provided through a data network.

42. The method of claim 41, wherein the data network is an internet.

43. A method of operating a gaming device, for each play of a game, said method comprising:
(a) receiving data indicating a predetermined game award, wherein said predetermined game award is determined prior to any placement of any wager associated with said play of the game;
(b) prior to modifying any accepted offers by any multipliers, receiving a plurality of inputs to accept or reject a plurality of potential offers, wherein each potential offer is divisible into the received predetermined game award and if data indicating a first predetermined game award is received, each of the potential offers are divisible into the first predetermined game award and if data indicating a second, different predetermined game award is received, each of the potential offers are divisible into the second, different game award; and
(c) after receiving the plurality of inputs to accept or reject said plurality of potential offers:
(i) determining a modifier of the accepted offer, wherein said modified is determined by dividing the received predetermined game award by said accepted offer,
(ii) modifying the accepted offer by the determined multiplier,
(iii) causing a display device to display the modified accepted offer, wherein said modified accepted offer equals said received predetermined game award, and
(iv) providing the modified accepted offer, wherein:
(A) a credit balance is increasable based on the received predetermined game award, and
(B) said credit balance is:
(I) increasable via: (1) an acceptor of a physical item associated with a monetary value, and (2) a validator configured to identify the physical item, and
(II) decreasable via a cashout device configured to receive an input to cause an initiation of a payout associated with the credit balance.

44. The method of claim 43, wherein said accepted offer is a final offer.

45. The method of claim 43, which is provided through a data network.

46. The method of claim 45, wherein the data network is an internet.

* * * * *